(12) United States Patent  
Dong

(10) Patent No.: US 8,077,973 B2
(45) Date of Patent: Dec. 13, 2011

(54) HANDWRITTEN WORD RECOGNITION BASED ON GEOMETRIC DECOMPOSITION

(75) Inventor: Jianxiong Dong, Montreal (CA)

(73) Assignee: IMDS Software, Inc., Montreal, Quebec (CA)

( * ) Notice: Subject to any disclaimer, the term of this patent is extended or adjusted under 35 U.S.C. 154(b) by 880 days.

(21) Appl. No.: 11/344,505

(22) Filed: Jan. 30, 2006

(65) Prior Publication Data

US 2006/0193518 A1    Aug. 31, 2006

Related U.S. Application Data

(60) Provisional application No. 60/647,396, filed on Jan. 28, 2005.

(51) Int. Cl.
*G06K 9/18* (2006.01)
(52) U.S. Cl. ...................................... 382/186
(58) Field of Classification Search .................. 382/186, 382/187, 199
See application file for complete search history.

(56) References Cited

U.S. PATENT DOCUMENTS

| 3,133,266 | A  | * | 5/1964 | Frishkopf | 382/186 |
| 5,583,956 | A  | * | 12/1996 | Aghajan et al. | 382/290 |
| 2002/0114508 | A1 | * | 8/2002 | Love | 382/154 |
| 2006/0050962 | A1 | * | 3/2006 | Geiger et al. | 382/186 |
| 2008/0253659 | A1 | * | 10/2008 | Walch | 382/186 |

OTHER PUBLICATIONS

Malayappan Shridhar, Fumitaka Kimura, Yimei Ding, and John W. V. Miller, Slant correction for handwritten English documents, Proc. SPIE 5606, 1 (2004), DOI:10.1117/12.580524.*

Marcus V. Lamar, Md. Shoaib Bhuiyan, and Akira Iwata, Hand Gesture Recognition using T-CombNET: A New Neural Network Model, IEICE Trans. Inf. & Syst., vol. E83-D, No. 11 Nov. 2000.*
Marcus V. Lamar, Md. Shoaib Bhuiyan, and Akira Iwata, Hand Gestue Recognition using T-CombNET: A New Neural Network Model, IEICE Trans. Inf. & Syst., vol. E83-D, No. 11 Nov. 2000.*
Plamondon, R.; Privitera, C.M.; "The segmentation of cursive handwriting: an approach based on off-line recovery of the motor-temporal information," Image Processing, IEEE Transactions on, vol. 8, No. 1, pp. 80-91, Jan. 1999 doi: 10.1109/83.736691 URL: http://ieeexplore.ieee.org/stamp/stamp.jsp?tp=& arnumber=736691&isnumber=15895.*
Madhvanath, S.; Kim, G.; Govindaraju, V.; "Chaincode contour processing for handwritten word recognition," Pattern Analysis and Machine Intelligence, IEEE Transactions on, vol. 21, No. 9, pp. 928-932, Sep. 1999 doi: 10.1109/34.790433 URL: http://ieeexplore.ieee.org/stamp/stamp.jsp?tp=&arnumber=790433&isnumber=17189.*
Bozinovic et al., "*Off-line cursive script word recognition*", IEEE Trans. Pattern Anal. Machine Intell., vol. 11, No. 1, pp. 68-83, Jan. 1989.

(Continued)

*Primary Examiner* — Brian Werner
*Assistant Examiner* — Nirav G Patel
(74) *Attorney, Agent, or Firm* — Fay Kaplun & Marcin, LLP

(57) ABSTRACT

A method of recognizing a handwritten word of cursive script includes providing a template of previously classified words, and optically reading a handwritten word so as to form an image representation thereof comprising a bit map of pixels. The external pixel contour of the bit map is extracted and the vertical peak and minima pixel extrema on upper and lower zones respectively of this external contour are detected. Feature vectors of the vertical peak and minima pixel extrema are determined and compared to the template so as to generate a match between the handwritten word and a previously classified word. A method for classifying an image representation of a handwritten word of cursive script is also provided. Also provided is an apparatus for recognizing a handwritten word of cursive script.

11 Claims, 11 Drawing Sheets

OTHER PUBLICATIONS

Chen et al., "*Off-line handwritten word recognition using a hidden markov model type stochastic network*", IEEE Trans. Pattern Anal. Machine Intell., vol. 16, No. 5, pp. 481-496, May 1994.

Bunke et al., "*Off-line cursive handwritten recognition using hidden markov models*", Pattern Recognition, vol. 28, No. 9, pp. 1399-1413, 1995.

Gader et al., "*Handwritten word recognition with character and intercharacter neural networks*", IEEE Trans. Syst., vol. 27, No. 1, pp. 158-164, Feb. 1997.

Kim et al., "*A lexicon driven approach to handwritten word recognition for real-time applications*", IEEE Trans. Pattern Anal. Machine Intell., vol. 19, No. 4, pp. 366-379, Apr. 1997.

Senior et al., "*An off-line cursive handwritting recognition system*", IEEE Trans. Pattern Anal. Machine Intell., vol. 20, No. 3, pp. 309-321, Mar. 1998.

El-Yacoubi et al., "*An HMM-based approach for off-line unconstrained handwritten word modeling and recognition*", IEEE Trans. Pattern Anal. Machine Intell., vol. 21, No. 8, pp. 752-760, Aug. 1999.

Vinciarelli et al., "*Offline recognition of unconstrained handwritten texts using hmms and statistical language models*", IEEE Trans. Pattern Anal. Machine Intell., vol. 26, No. 6, pp. 709-720, Jun. 2004.

Madhvanath et al., "*The role of holostic paradigms in handwritten word recognition*", IEEE Trans. Pattern Anal. Machine Intell., vol. 23, No. 2, pp. 149-164, Feb. 2001.

Seidenberg et al., "*A distributed, developmental model of word recognition and naming*", Psychological Review, vol. 96, No. 4, pp. 523-568, 1989.

Plaut et al., "*Understanding normal and impaired word reading: Computational principles in quasi-regular domains*", Psychological Review, vol. 103, pp. 56-115, 1996.

Madhvanath et al., "*Chaincode contour processing for handwritten word recognition*", IEEE Trans. Pattern Anal. Machine Intell., vol. 21, No. 9, pp. 928-932, Sep. 1999.

Biederman, "*Recognition by components: A theory of human image understanding*", Psychological Review, vol. 94, No. 2, pp. 115-147, 1987.

Biederman, "*Size invariance in visual object priming*", Journal of Experimental Psychology: Human Perception and Performance, vol. 18, No. I, pp. 121-133, 1992.

McClelland et al., "*An interactive activation model of context effects in letter perception*", Psychological Review, vol. 88, pp. 375-407, Sep. 1981.

Elder, "*Are edges incomplete?* ", International Journal of Computer Vision, vol. 4, No. 23, pp. 97-122, 1999.

Slavik et al., "*Equivalence of different methods for slant and skew corrections in word recognition applications*", IEEE Trans. Pattern Anal. Machine Intell., vol. 23, No. 3, pp. 323-326, Mar. 2001.

Morita et al., "*Mathematical morphology and weighted least squares to correct handwritting baseline skew*", in Proc. IEEE International Conference on Document. Analysis and Recognition, pp. 430-433, India, 1999.

Cote et al., "*Automatic reading of cursive scripts using a reading model and perceptual concepts*", International Journal on Document Analysis and Recognition, vol. 1, No. 1, pp. 3-17, 1998.

Vinciarelli et al., "*A new normalization technique for cursive handwritten words*", Pattern Recognition Letters, vol. 22, No. 9, pp. 1043-1050, 2001.

Schomaker et al., "*Finding features used in the human reading of cursive handwritting*", International Journal on Document Analysis and Recognition, vol. 2, pp. 13-18, 1999.

Fujisawa et al., "*Handwritten numeral recognition using gradient and curvature of gray scale image*", in Proc. Of International Conference on Document Analysis and Recognition, pp. 277-280, India, 1999.

Mohamed et al., "*Handwritten word recognition using segmentation free hidden markov modeling and segmentation-based dynamic programming techniques*", IEEE Trans. Pattern Anal. Machine Intell., vol. 18, No. 6, pp. 548-554, May 1996.

Bunke, "*Recognition of cursive roman handwriting- past, present and future*", in Proc. of IEEE $7^{th}$ International Conference on Document Analysis and Recognition, pp. 448-459, Scotland, 2003.

Viard-Gaudin et al., "*The IRESTE on/off (IRONOFF) dual handwritting database*", in Proc. of IEEE International Conference on Document Analysis and Recognition, pp. 455-458, India, 1999.

Marti et al., "*The IAM-database: an English sentence database for offline handwritting recognition*", International Journal on Document Analysis and Recognition, vol. 5, pp. 39-46, 2002.

Itti et. al., "*A model of saliency-based visual attention for rapid scene analysis*", IEEE Trans. Pattern Anal. Machine Intell., vol. 20, No. 11, pp. 1254-1259, Nov. 1998.

Rabiner, "*A tutorial on hidden markov models and selected applications in speech recognition*",Proceedings of the IEEE, vol. 77, No. 2, pp. 257-286, Feb. 1989.

Kavallieratou et al., "*New algorithms for skewing correction and slant removal on word-level*", in Proc. IEEE $6^{th}$ International Conference on Electronics, Circuits and Systems, Pafos, Cyprus, pp. 1159-1162, Sep. 1999.

Srihari, "Recognition of Handwritten and Machine-printed Text for Postal Address Interpretation", Pattern Recognition Letters, vol. 14, No. 4, Apr. 1993, pp. 291-302.

Knerr et al., "Hidden Markov Model Based Word Recognition and Its Application to Legal Amount Reading on French Checks", Computer Vision and Image Understanding, vol. 70, No. 3, Jun. 1998, pp. 404-419.

McClelland et al., "An Interactive Activation Model of Context Effects in Letter Perception: Part 1. An Account of Basic Findings", Psychological Review, vol. 88, No. 5, Sep. 1981, pp. 375-407.

Ellis, "Modelling the Writing Process", Perspectives on Cognitive Neuropsychology, Lawrence Erlbaum Associates, Publishers, 1986, pp. 189-211.

Hollerbach, "An Oscillation Theory of Handwriting", Biological Cybernetics, vol. 39, 1981, pp. 139-156.

Teulings et al., "Computer-Aided Analysis of Handwriting Movements", Visible Language, vol. 13, 1979, pp. 218-231.

Haber et al., "Word Length and Word Shape as Sources of Information in Reading", Reading Research Quarterly, vol. 18, No. 2, Winter 1983, pp. 165-189.

Madhvanath et al., "Holistic Lexicon Reduction", Proc. Third Int'l Workshop Frontiers in Handwriting Recognition, 1993, pp. 71-81.

Edelman et al., "Reading Cursive Handwriting by Alignment of Letter Prototypes", International Journal of Computer Vision, vol. 5, No. 3, 1990, pp. 303-331.

Hartline, "The Response of Single Optic Nerve Fibers of the Vertebrate Eye to Illumination of the Retina", The American Journal of Physiology, vol. 121, 1938, pp. 400-415.

Sakoe et al., "Dynamic Programming Algorithm Optimization for Spoken Word Recognition", IEEE Transactions on Acoustics, Speech, and Signal Processing, vol. ASSP-26, No. 1, Feb. 1978, pp. 43-49.

* cited by examiner (a)  (b)

| | | | |
|---|---|---|---|
| quinze | cinquante | mille | cts |
| (a) | (b) | (c) | (d) |
| Cinquante | treinta | dix | quinze |
| (e) | (f) | (g) | (h) |
| onze | trois | seize | cinq |
| (i) | (j) | (k) | (l) |
Fig. 24
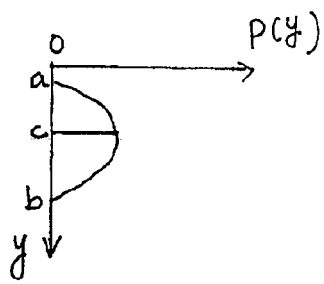
Fig. 20(b)
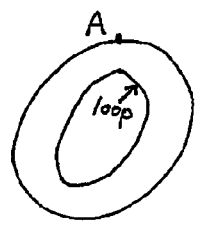
Fig. 25

HANDWRITTEN WORD RECOGNITION BASED ON GEOMETRIC DECOMPOSITION

CROSS-REFERENCE APPLICATION

The present application requests priority on U.S. Provisional Application No. 60/647,396 filed Jan. 28, 2005 which is incorporated by reference herein in its entirety.

FIELD OF THE INVENTION

The present invention relates to handwritten word recognition. More specifically but not exclusively, the present invention relates to handwritten word recognition based on geometric decomposition.

BACKGROUND OF THE INVENTION

Handwriting is one of the basic human communication tools, such as speech, sign and expression. Handwriting has been widely applied in our daily life. For example, people sign their signature in bank cheques and letters. Students acquire the knowledge in class when teachers write their lecture notes on the blackboard. Businesses recruit new employees by way of graphology, which is the study of handwriting shapes and patterns to determine the personality and behaviour of the writer. Although handwriting is such an efficient communication tool in our mind, how handwritten signals are mentally represented in the brain and what kinds of functionality mechanism underlies handwritten recognition is little known to us. Automatic analysis and recognition of handwritten signals by computers can help us better understand this problem to some extent.

The general off-line cursive handwritten recognition is a very challenging task although considerable progress [1][2][3][4][5][6][7] has been made in this domain over the last few years. Most recognition systems [8][9] have achieved a good performance which greatly depends on the constraints imposed such as contextual knowledge, size of the vocabulary, writing style and experimental conditions. Recently an off-line cursive recognition system dealing with large vocabulary unconstrained handwritten texts has been investigated [10]. Instead of modelling a word, this recognition system models a handwritten line by the integration of Hidden Markov models and N-gram word statistical language models in order to avoid the problem of handwritten word segmentation and make efficient use of contextual information. Although authors have shown that the use of language models improves the performance on some databases, the computational cost of this system is much higher than that based on an isolated word. It is well known that linguistic information plays an important role in cursive word recognition. From a biological point of view, the computational efficiency is as important as the accuracy in a human's recognition system. Therefore, the computer-based cursive word recognition system where that information is integrated should abide by the principle of computational efficiency.

Although a considerable number of off-line cursive handwriting recognition systems have been presented in the literature, the solutions to several key problems related to handwritten word recognition remain unknown. One of the most important problems is the representation of a cursive word image for a classification task. Intuitively, although a handwritten word is concatenated by a small set of handwritten characters (52 characters in English) from left to right, its shape exhibits various variations, which depend on the uncertainty of human writing. The boundaries between characters in a handwritten word are intrinsically ambiguous due to overlapping and inter-connections. The changes in the appearance of a character usually depend on the shapes of neighbouring characters (coarticulation effects). In the current literature these representation methods for cursive words usually fall into the categories described hereunder.

The image of the given word is considered as an entity in its whole and the difficult problem of segmenting a word into its individual characters is completely avoided. A word is characterized by a sequence of features such as length, loops, ascenders, descenders. No sub-models are used as a part of its classification strategy. The recognition method based on this representation is called "holistic approach" (see a recent survey in [11]). This method can model coarticulation effects. However, no uniform framework in the current literature is presented to extract those features. It is not clear how to solve the corresponding problem of feature points if some features are used as local shape descriptors. Moreover, the method does not make use of information of sub-models. As a result, information cannot be shared across different words. It is difficult to apply this method to cursive word recognition with a large lexicon since samples for each word is not sufficient.

The word image is segmented into a sequence of graphemes in left-to-right order. A grapheme may be one character or a part of a character. After the segmentation, all possible combinations of adjacent graphemes, up to a maximum number, are considered and fed into a recognizer for isolated characters. Then a dynamic programming technique is used to choose the best sequence of characters. There are two problems related to this method. One is that segmentation and grapheme recombination are both based on heuristic rules that are derived by human intuition. They are error-prone. The other is that the proposed framework is not computationally efficient since a character recognizer has to be used to evaluate each grapheme combination. For a large lexicon, the computational cost is prohibitively high.

Features are extracted in a left-to-right scan over the word by a sliding window. No segmentation is required. There are two main problems related to this method. One is that some topological information such as stroke continuity will be partially lost. But stroke continuity is an important constraint for handwritten signals. The other is how to determine the optimal width of a sliding window. From a signal viewpoint, the method based on a sliding window can be regarded as a one-dimensional uniform sampling on a two-dimensional signal. In general, the sampling width depends on the sampling position. Some information will be lost based on uniform sampling.

The other important problem is how to integrate the orthography (or phonology) into the recognition system effectively. It is known that orthography and phonology play important roles in human word reading [12][13]. Orthography and phonology impose strong constraints on cursive word recognition. Most of the existing methods use statistical language models such as character (or word) N-gram as a post-processing tool in the recognition. These language models are basically built based on a large text corpus. To our knowledge, no work is done to investigate how orthographic representations directly develop from primitive visual representations (word images, visual features).

In the following subsections, a general viewpoint of cursive word recognition from several disciplines such as visual perception and linguistics is first presented in order to understand the essential nature of this problem. Then the literature related to word skew/slant corrections and word representation is reviewed

A. Perspective of Cursive Word Recognition

1) Size of Vocabulary:

How many words are there into English? There is no single sensible answer to this question. It is impossible to count all words. English words have many inflections such as noun, plural, tense of a verb. Is "hot dog" really two words since we may also find "hot-dog" or even "hotdog"? In addition, many words from other languages enter into English. Sometimes, new scientific terms will be generated.

In order to obtain an approximated size, one can resort to the Oxford English Dictionary. The Second Edition of the Oxford English Dictionary (OED) [14] contains full entries for 171,476 words in current use, and 47,156 obsolete words. To this may be added around 9,500 derivative words included as subentries. Over half of these words are nouns, about a quarter adjectives, and about a seventh verbs; the rest is made up of interjections, conjunctions, prepositions, suffixes, etc. These figures take no account of entries with senses for different parts of speech (such as noun and adjective). This suggests that there are at the very least, a quarter of a million distinct English words, excluding infections and words from technical and regional vocabulary not covered by the OED, or words not yet added to the published dictionary, of which perhaps 20 percent are no longer in current use. If distinct senses were counted, the total would probably approach three quarters of a million.

As we know that there is a huge size of vocabulary, it is impossible to work on all word entries in the Oxford English Dictionary for the research of cursive word recognition at the current stage. Then we have to choose a part of vocabulary. One of the important criteria for word selection is word frequency, which can be calculated according to a large language corpus. Some dictionaries such as the Collins COBUILD Advanced learner's English Dictionary provide information about word frequency. The other strategy is to cluster the vocabulary according to some similarity measures. Then we focus on the research of cursive recognition in individual group.

2) Cursive Word Visual Perception:

Visually, handwritten word images mainly consist of some primitives such as lines, arc, and dots. FIG. 1 shows some examples.

In FIG. 1, it can be observed that neighbouring characters are usually connected and it is very difficult to segment a word image into character components. This suggests that the crude segmentation by means of heuristic rules be not robust due to the intrinsic ambiguity of character boundaries. From FIG. 1, we can also observe other characteristics of handwritten signals. For example, character 'n' and 'r' in images (h) and (l) are almost skipped, respectively. For image (i) and (k), it is difficult to identify individual characters. Intuitively, the useful information seems to exist in the global shapes which are characterized by some extreme points. For image (g), it should be identified as "aud" from a pure shape recognition. But orthography imposes strong constraints on word identity. Humans can easily recognize it as "and". This indicates that orthography plays an important role in cursive word recognition. The identity of word image (o) is ambiguous. It can be "care" or "case". In this case, the contextual information in a sentence will be required to identify it. Usually humans can identify most isolated words without the contextual information in a sentence. We can draw from this fact that word image and orthography (and phonology) may provide enough information for recognition without higher-level linguistic information. From the computational viewpoint, the computational structure will be modularized easily and the dependence of functionality modules between difference levels will be reduced. As a result, computational efficiency will be enhanced.

What is the good representation of cursive word recognition? Although the complete answer to this question is still unknown, we may obtain some clues from the research of computer vision, psychology, and human reading. Marr [15] suggested that the representations underlying visual recognition are hierarchical and involve a number of levels during the early visual processing. Each level involves a symbolic representation of the information in the retinal image. For example, the primal sketch defined by Marr consists of some primitives and makes explicit important information about two-dimensional images. Edge, blobs, contour and curvilinear organization contains useful information for visual recognition. Cursive word image is binary and 2D shape, which is not a function of depth. Moreover, it consists of line drawing patterns, such as lines and arcs. The important information such as curvatures, orientations, loops, global shape, convex and concave properties can be derived from a word image contour. Biederman [16] [17] proposed a theory of entry-level objection that assumes that a given view of an object is represented as an arrangement of simple, viewpoint-invariant, volumetric primitives called geons. The position relationships among the geons are specified so that the same geons in different relations will represent different objects. These geons are activated by local image features. This view of part-based representation sounds attractive for cursive word recognition. Although the size of vocabulary is large, each word basically consists of a small number of letters. But letters in a word are possibly activated in high-level stage since in image level it is hard to solve the segmentation problem. McClelland and Rumelhart [18] proposed an interactive activation word reading model. A bottom-up and top-down process is integrated to this model. This indicates that letter representation is driven by bottom-up (low-level features to letter) and top-down (word to letter) information. Learning must play an important role in the representation.

Is wavelet-based coding a good representation of cursive word image? Although wavelet-based coding is mathematically complete or over-complete, the wavelet code does not meet the explicit criteria [19]. A wavelet code is simply a linear transform of the original image into a set of new images. There is no interpretation or inference in the process. The structures and features are not explicitly represented. For example, for cursive word recognition, we know that loops and word length are useful information for recognition. It is hard to extract them from redundant wavelet codes.

3) Word Linguistic Information:

Words in the English language have a specified structure. These structure constraints are usually imposed by orthography (the way a word is spelled) and phonology (the way a word is pronounced). For words of length 10 (10 letters), although the maximal combination is 26, valid words only exist in a small-size subset. In the context of cursive word recognition, a statistical language model such as n-grams is usually used to improve the performance [10]. Those models usually have several shortcomings. First, the accuracy of language models is very sensitive to the text domains. When the domain is changed, the language model has to be trained with data in a new domain. In some cases, the large text corpus in a domain may be not available. Second, the orthography information is not directly encoded from local image features. The extra complexity is introduced by statistical language model and it may be not necessary to infer the identity of a word image. As a result, the system accuracy will be degraded. In our view, a connectionist approach could be applied to implement the nonlinear transformation. FIG. 2 shows the transformation framework concept.

In FIG. 2, the phonology transformation network is enclosed with a dotted line. In current research, it is not very clear whether the phonology information is applied to visual word recognition. The distribution code can be slot-based 18 or a relational unit [20][13]. For the first case, each letter goes to its corresponding position. For the second case, the relational unit (called grapheme) consists of one or more letters (e.g. L, T, TCH). A word can be translated into several graphemes. When a multi-letter grapheme is present, its components are activated. For example, "TCH" will activate 'T' and 'CH'. The main characteristic of the above representation is that the strength of orthographic units' output depends on not only co-occurrence frequency but also network structure and current input data.

4) Handwriting Process:

Handwriting production is a complex process which involves a large number of highly cognitive functions including vision, motor control and natural language understanding. The production of handwriting requires a hierarchically organized flow of information through different transforms [21]. FIG. 3 shows this process.

The writer starts with the intention to write a message. Then this message is converted to words by means of lexical and syntactical levels. During the writing, the writer plans to select the suitable allographs (shape variants of letters) in advance of the execution process. The choice may depend on the context of neighbouring allographs. This indicates that a visual feedback mechanism is involved in the writing process. Hollerbach [22] proposed an oscillatory motion model of handwriting. In this model, cursive handwriting is described by two independent oscillatory motions superimposed on a constant linear drift along the line of writing. The parametric form is given by:

$$x(t)=A_x(t)\cos(w_x(t-t_0)+\phi_x)+C(t-t_0)$$

$$y(t)=B_y(t)\cos(w_y(t-t_0)+\phi_y), \quad (1)$$

where $w_x$ and $w_y$ are the angular velocities, respectively, $A_x(t)$ and $B_y(t)$ are the horizontal and the vertical amplitude modulations, respectively, and C is the horizontal drift. On online handwriting, a general pen trajectory can be encoded by the parameters in the above model [23]. The simplified model indicates what kinds of information are important in cursive handwriting signals. This information can guide us to extract the features in offline cursive word recognition.

The studies of handwriting have found that the atomic movement unit in handwriting is a stroke, which is a movement trajectory bounded by two points of high curvature (or a trajectory between two velocity minima [24]). Handwriting signals can be segmented reliably into strokes based on this method [24]. This important information indicates that neither letters nor graphemes are basic units at the stage of low-level feature extraction.

5) Handwriting Analysis:

Handwriting analysis (also called graphology) is the study of handwriting shapes and patterns to determine the personality and behaviour of the writer. The graphologists (forensic document examiners) examines some features such as loops, dotted "i's" and crossed "t's," letter and line spacing, slants, heights, ending strokes, etc. and they believe that such handwriting features are physical manifestations of unconscious mental functions. There is a basic principle underlying graphology: handwriting is brain-writing. From the viewpoint of ecology, interactions of individual experiences and social environments have an effect in handwriting since handwriting is a graphic realization of natural human communication. Although this area is less related to cursive word recognition than computer vision and psychology, it shows that a lot of features are shared by different individuals. The features examined by graphologists could provide some information about feature extraction to the researchers of handwritten recognition.

6) Summary:

Although there is no high-performance system for large-scale cursive word recognition, the development of such a system may require to underlie the following rules from the above perspective:

Computation efficiency is as important as accuracy. Parallel computation is desirable.

The recognition system must be hierarchical. For example, the units such as strokes, graphemes, letters and words must be constructed in an increasing level.

The orthography information must be integrated directly into the system.

Biological relevance must be compatible with established facts from neuroscience.

Perceptual relevance must conform with well-established experiments and principles from Gestalt Psychology.

Most of the parameters must be obtained by learning.

B. Previous Studies for Word Skew/Slant Corrections

In most cursive word recognition, correcting the skew (deviation of the baseline from the horizontal direction—FIG. 4(a)) and the slant (deviation of average near-vertical strokes from the vertical direction—FIG. 4(b)) is an important pre-processing step [25]. The slant and slope are introduced by writing styles. Both corrections can reduce handwritten word shape variability which depends on writer and help the latter operations such as segmentation and feature extraction.

For the skew and slant corrections, the crucial problem is to detect the skew and slant angles correctly. Once two angles are found, skew and slant corrections are implemented by rotation and by a shear transformation, respectively. In the literature, several methods have been proposed to deal with this problem. In [6], the horizontal and vertical density histograms are used to estimate the middle zone. Then a reference line is estimated by fitting through stroke local minima in the middle zone. In [26], image contour is used to detect those minima. Marita et al. [27] proposed a method based on mathematical morphology to obtain a pseudo-convex hull image. Then minima are detected on the pseudo-convex image and a reference line is fit through those points. The primary challenge for these methods is the rejection of spurious minima. Also, the regression-based methods do not work well on short words because of lack of sufficient number of minima points. The other approaches for the detection of slope angle are based on the density distribution. In [28], several histograms are computed for different y (vertical) projections. Then the entropy is calculated for each of them. The histogram with the lowest entropy will determine the slope angle. In [29], the Wigner-Ville distribution is calculated for several horizontal projection histograms. The slope angle is selected by Wigner-Ville distribution with the maximal intensity. The main problem for those distribution-based methods is a high computational cost since an image has to be rotated for each angle. Also, these methods do not perform well for short words. For the slant estimation, the most common method is the calculation of the average near-vertical strokes [1][5][7]. These methods use different criteria to select near-vertical strokes. The slopes of those selected strokes are estimated from contours. The main disadvantage of those methods is that many heuristic parameters have to be specified. Vinciarelli et al. [30] proposed a technique based on a cost function which measures slant absence across the word image. The cost function is evaluated on multiple shear transformed word images. The angle with the maximal cost is taken as a slant estimate. Kavallieratou et al. [29] proposed a slant estimation algorithm based on the use of vertical projection profile of word images and the Wigner-Ville distribution. The approaches based on the optimization are relatively robust. However, the above two methods are computationally heavy since multiple shear transformed word images corresponding to different angles in an interval have to be calculated.

C. Previous Studies for Handwritten Word Representation

One of the important problems in cursive word recognition is to extract the discriminative features. There has been extensive research in the extraction of different-level features for handwritten words. The ascenders and descenders [31] and word length [32] are perceptual features in human reading. These features are usually used in holistic recognition of handwritten words [33]. But the accurate detection of these features become a challenge due to the uneven writing and curved baseline. Highly local, low-level structure features such as stroke direction distribution based on image gradients [34] that have been successfully applied to character recognition are generally unsuitable for offline cursive word recognition due to wide variation in style. In [35], [10], a word image is represented as a sequence of slice windows from left to right. In each small window, an observation vector will be extracted and used in Hidden Markov Models. Although this strategy attempts to avoid the segmentation, there are several shortcomings for this method. The slice window does not correspond to any perceptual units such as strokes, letters. In most cases, these windows contain meaningless fragments, which are not compatible with the Gestalt principles of perception (similarity) [36]. Moreover, no inference has been made during the process. In contrast to the method of slice windows, the other strategy is to segment a word image into graphemes that are ordered from left to right [9], [7] and then extract geometrical and structure features for each grapheme. But the segmentation is usually done in the horizontal direction and is still one-dimension while handwriting is a two-dimensional signal.

By reviewing the above methods, it has been found that none of them imply where the important information is located in a word image and how to organize them efficiently. The research in psychology and computer vision has indicated that a good representation underlying visual recognition is hierarchical and involves a number of levels [15]. Edge, blobs, contour and curvilinear organization contain useful information for visual recognition. A cursive word image is usually binary and 2D in shape, which is not a function of depth. Moreover, it consists of line drawing patterns such as lines and arcs. Since words are written by humans, handwriting signals may satisfy some physical constraints such as Newton's laws of motion. When a word image is viewed as a 2D curve, most of the important information such as curvatures, orientations, loops, global shape, local convex and concave properties can be derived from an image contour. The corners on a contour exhibit more invariant properties than other points.

SUMMARY OF THE INVENTION

In accordance with the present invention, there is provided a method of recognizing a handwritten word of cursive script, the method comprising: providing a template of previously classified words; optically reading a handwritten word so as to form an image representation thereof comprising a bit map of pixels; extracting an external pixel contour of the bit map; detecting vertical peak and minima pixel extrema on upper and lower zones of the external contour respectively; determining respective feature vectors of the vertical peak and minima pixel extrema and comparing the feature vectors with the template so as to generate a match between a handwritten word and a previously classified word.

In accordance with another aspect of the present invention there is provided a method for classifying an image representation of a handwritten word of cursive script, the method comprising: optically reading a handwritten word so as to form an image representation thereof comprising a bit map of pixels; extracting a pixel contour of the bit map; detecting vertical peak and minima pixel extrema on upper and lower zones of the contour respectively; organizing the peak and minima pixel extrema into respective independent peak and minima sequences, determining the respective feature vectors of the peak and minima sequences; and classifying the word image according to the peak and minima feature vectors.

In an embodiment, organizing comprises organizing the peak and minima pixel extrema into respective independent peak and minima sequences before said determining respective feature vectors of said vertical peak and minima pixel extrema. In an embodiment, determining comprises determining feature vectors of the vertical peak and minima sequences.

In an embodiment, a vertical peak pixel extrema comprises a pixel point on the upper zone of said pixel contour wherein neighbouring pixel segments are convex relative thereto. In an embodiment, a vertical minima pixel extrema comprises a pixel point on the lower zone of the pixel contour wherein neighbouring pixel segments are concave relative thereto.

In an embodiment, organizing the peak and minima pixel extrema into the respective independent peak and minima sequences comprises extracting features at each of the extrema selected from the group consisting of:
  the number of local extrema neighboring a given extrema on a same closed curve of said word image contour, said local extrema having a convex attribute corresponding to that of said given extrema;
  the number of local extrema neighboring a given extrema on a same closed curve of said word image contour, said local extrema having a different convex attribute from said given extrema;
  the lesser of the height difference between a given extrema and a left neighboring extrema and of the height difference between said given extrema and a right neighboring extrema, wherein said left and right neighboring extrema have convex attribute corresponding to that of said given extrema;
  the lesser of the height difference between a given extrema and a left neighboring extrema and of the height difference between said given extrema and a right neighboring extrema, wherein said left and right neighboring extrema have a different convex attribute than that of the given extrema;
  the number of peaks above a given extrema divided by the total number of peaks on the pixel contour;
  the number of peaks below a given extrema divided by the total number of peaks on the pixel contour;
  the y/h position of the given extrema, wherein y represents the y-axis coordinate of the given extrema and h represents the height of the word image;
  the lesser of a contour portion length between a given the extrema and a left neighboring peak and of a contour portion length between a given extrema and a right neighboring peak, wherein the neighboring peaks and the given extrema are on a same closed curve;

the lesser of a contour portion length between a given extrema and a left neighboring minima and of a contour portion length between a given extrema and a right neighboring minima, wherein the neighboring minima and the given extrema are on a same closed curve;

the lesser of a height difference between a given extrema and a left neighboring peak and of a given extrema and a and right neighboring peak, wherein said neighboring peaks and said given extrema are on a same closed curve;

the lesser of a height difference between a given extrema and a left neighboring minima and of a given extrema and a and right neighboring minima, wherein said neighboring minima and said given extrema are on a same closed curve;

the height ratio of a given extrema and neighboring left and right extrema as defined by $(y_A - y_{tl})/(y_n - y_{tln})$ wherein a given extrema is represented by A, a lowest extrema of the left or right neighboring extrema is represented by n, $y_{tl}$ represents the y-coordinate of the top-left corner of a contour or a closed curve, $y_{tln}$ represents the top-left corner of a contour or a closed curve where point n is located $y_A$ and $y_n$ represent the y-coordinate of A and n respectfully;

the distance between a given extrema and a vertical intersection point.; and any combination thereof.

In an embodiment, determining the respective feature vectors comprises extracting features at each extrema selected from the group consisting of:

height difference between a given extrema and a left neighboring extrema having a convex attribute corresponding to the that of the given extrema;

height difference between a given extrema and a right neighboring extrema having a convex attribute corresponding to that of the given extrema;

relative horizontal position of given extrema defined by:

$$f_3^c = \frac{x - x_{lt}}{w}$$

wherein the word image pixel contour is enclosed in a rectangle, the width and height of the rectangle being w and h the coordinates of a given extrema being (x, y) and the coordinate of the top-left corner of the rectangle being $(x_{lt}, y_{lt})$ relative vertical position of a given extrema defined by:

$$\left(f_4^c = \frac{y - y_{lt}}{h}\right)$$

wherein the word image pixel contour is enclosed in a rectangle, the width and height of the rectangle being w and h the coordinates of a given extrema being (x, y) and the coordinate of the top-left corner of the rectangle being $(x_{lt}, y_{lt})$ projection ratio in the horizontal direction of a given extrema defined by:

$$f_5^c = \frac{\int_a^c p(x)dx}{\int_a^b p(x)dx}$$

wherein the given extrema is represented by c and having the coordinates (x, y), and p(x) represents the projection function bounded by the x-axis interval [a, b], projection ratio in the vertical direction ($f_6^c$) of a given extrema defined by $$f_6^c = \frac{\int_a^c p(y)dy}{\int_a^b p(y)dy}$$

wherein the given extrema is represented by c and having the coordinates (x, y), and p(y) represents the projection function bounded by the y-axis interval [a, b];

the greater of a height difference between a given extrema and a left neighboring extrema and of a given extrema and a right neighboring extrema, wherein the left and right neighboring extrema comprise convex attributes corresponding to that of the given extrema if there is an inner loop below a given extrema this feature is set to 1, if there is no inner loop below a given extrema this feature is set to 0;

total number of peaks of the pixel contour on which the given extrema is located;

total number of minima of the pixel contour on which the given extrema is located;

the height ratio of a given extrema and neighboring left and right extrema as defined by $(y_A - y_{tl})/(y_n - y_{tln})$ wherein a given extrema is represented by A, a lowest extrema of left or right neighboring extrema is represented by n, $y_{tl}$ represents the y-coordinate of the top-left corner of a contour or a closed curve, $y_{tln}$ represents the top-left corner of a contour or a closed curve where point n is located $y_A$ and $y_n$ represent the y-coordinate of A and n respectfully;

contour portion length between a given extrema and a left neighboring extrema comprising a convex attribute that is different than that of the given extrema;

contour portion length a given extrema and a right neighboring extrema comprising a convex attribute that is different than that of the given extrema;

height difference between a given extrema and a left neighboring extrema comprising a convex attribute that is different than that of the given extrema;

height difference between a given extrema and a right neighboring extrema comprising a convex attribute that is different than that of the given extrema;

number of pixels with a horizontal orientation on a contour portion between the a given pixel and left neighboring extrema comprising a convex attribute that is different than that of the given extrema;

number of pixels with a vertical orientation on a contour portion between the a given pixel and left neighboring extrema comprising a convex attribute that is different than that of the given extrema;

number of pixels with a horizontal orientation on a contour portion between the a given pixel and right neighboring extrema comprising a convex attribute that is different than that of the given extrema;

number of pixels with a vertical orientation on a contour portion between a given pixel and a right neighboring extrema comprising a convex attribute that is different than that of the given extrema;

projection ratio of local extrema neighboring a given extrema, the local extrema being on the left of the given extrema given in a horizontal direction, the projection ration being defined by:

$$f_{20}^c = \frac{\int_a^c p(x)\,dx}{\int_a^b p(x)\,dx}$$

wherein the given extrema is represented by c and having the coordinates (x, y), and p(x) represents the projection function bounded by the x-axis interval [a, b];

projection ratio of local extrema neighboring a given extrema, the local extrema being on the right of the given extrema given in a horizontal direction, the projection ration being defined by $$f_{21}^c = \frac{\int_a^c p(x)\,dx}{\int_a^b p(x)\,dx}$$

wherein the given extrema is represented by c and having the coordinates (x, y), and p(x) represents the projection function bounded by the x-axis interval [a, b];

projection of vertical crossing number of a given extrema on the x-axis of the word image and quantification of the projection function to vertical crossing number intervals [0,3], [3,5], and [5,+∞];

crossing ratio in the horizontal direction defined by:

$$f_{25}^c = \frac{\int_a^c p(x)\,dx}{\int_a^b p(x)\,dx}$$

wherein the given extrema is represented by c and having the coordinates (x, y), and p(x) represents the projection function bounded by the x-axis interval [a, b];

projection ratio of local extrema neighboring a given extreme on the left thereof in a horizontal and having a convex attribute that is different than the given extrema, the projection ration defined by $$f_{25}^c = \frac{\int_a^c p(x)\,dx}{\int_a^b p(x)\,dx}$$

wherein the given extrema is represented by c and having the coordinates (x, y), and p(x) represents the projection function bounded by the x-axis interval [a, b];

projection ratio of local extrema neighboring a given extreme on the left thereof in a horizontal and having a convex attribute that is different than the given extrema, the projection ration defined by $$f_{25}^c = \frac{\int_a^c p(x)\,dx}{\int_a^b p(x)\,dx}$$

wherein the given extrema is represented by c and having the coordinates (x, y), and p(x) represents the projection function bounded by the x-axis interval [a, b];

and any combination thereof.

In accordance with a further aspect of the present invention there is provided an apparatus for recognizing a handwritten word of cursive script, the apparatus comprising a template of words having been previously classified according to feature vectors, a reader for optically reading a handwritten word, and a controller being linked to the template and said reader;

wherein said controller: forms an image representation of said handwritten word comprising a bit map of pixels; extracts a pixel contour of the bit map; detects vertical peak and minima pixel extrema on upper and lower zones of the contour respectively; determines respective feature vectors of the peak and minima sequences; and compares these feature vectors with the template so as to generate a match between the handwritten word and a previously classified word.

In accordance with yet another aspect of the present invention there is provided an apparatus for recognizing a handwritten word of cursive script, the apparatus comprising means for providing a template of previously classified words;

means for optically reading a handwritten word so as to form an image representation thereof comprising a bit map of pixels;

means for extracting an external pixel contour of the bit map;

means for detecting vertical peak and minima pixel extrema on upper and lower zones of the external contour respectively;

means for determining respective feature vectors of the vertical peak and minima pixel extrema; and means for comparing said feature vectors with the template so as to generate a match between said handwritten word and a said previously classified word.

In accordance with yet a further aspect of the present invention there is provided a method for correcting a slant of an image representation of a handwritten word of cursive script comprising a bit map of pixels, the method comprising:

pre-computing a look-up table of the image representation that maps Cartesian coordinates to polar coordinates;

performing a Radon transform in the polar domain of the image representation; and calculating a slant angle from the Radon transform in the polar domain.

In an embodiment, the slant angle φ by means of the following equation:

$$\phi^* = \frac{\int_0^\pi \int_{-\infty}^\infty I(\phi,s)g(\phi,s)\phi\,d\phi\,ds}{\int_0^\pi \int_{-\infty}^\infty I(\phi,s)g(\phi,s)\,d\phi\,ds},$$

wherein g(φ, s) g(phi, s) is the Radon transform and I(φ, s) is an indicator function.

In accordance with still yet another aspect of the present invention, there is provided a method for correcting the skew of an image representation of a handwritten word comprising a bit map of pixels, the method comprising:

pre-computing a look-up table of the image representation that maps Cartesian coordinates to polar coordinates;

prerforming a Radon transform in the polar domain of the image representation; and calculating a skew angle from the Radon transform.

In an embodiment, the skew angle φ is calculated by means of the following equation $$\phi^* = \arg\max_{\phi} \int_{-\infty}^{\infty} g(\phi, s) g'(\phi, s) ds$$

wherein g(φ,s) g(phi, s) is the radon transform and g'(φ,s) is the radon transform of flow gradient Definitions:

The following definitions have been attributed to the terms hereunder for indicative purposes only and by no means as a limitation of scope. In fact, as the person having ordinary skill in the art easily understands, the terminology with respect to the present invention can be varied and the same word can have a variety of meanings depending on the context, for this reason and for this reason only, and unless otherwise specified by the text or the context thereof in association with the appended drawings, the following definitions have been attributed for clarity purposes.

The term "template" should be construed herein to include without limitation a database and the like.

The term "contour" should be construed herein to include without limitation the series of external or edge pixels of a whole broken or unbroken word image. Examples of a "contour" or a "word image pixel contour" are shown in FIGS. 12, 14 to 9 and 23.

The term "closed curve" should be construed herein to include without limitation a fully closed series of external or edge pixels which may be a word image or a portion of a word image such as a letter for example. An example of closed curves is shown in FIG. 16, which shows an image of the word "different", while the contour refers to the external pixels of the whole word "different" as previously defined, the closed curves are closed portions of this contour such as the portions "d", "i", "ff", and "erent". In the art these portions may sometimes be called contours as well, yet for clarity purposes the term "closed curve" is used instead.

The term "contour portion" should be construed herein to include without limitation a series of contiguous pixels on a word image pixel contour between two given pixel points.

The term "convex attribute" should be construed herein to include without limitation the general geometric shape or curvature of an extrema. For example as shown in FIGS. 12, 14 to 19, and 23 the convex attribute of peak extrema is a convex shape or configuration relative to the peak extrema pixel point, while the convex attribute of the minima extrema is a concave shape relative to the minima extrema pixel point. Therefore, peak extrema have a corresponding convex attribute (convex shape), minima extrema have a corresponding convex attribute (concave shape), and a peak extrema and a minima extrema have different convex shape since one is convex and the other is concave respectfully.

The term "inner loop" should be construed herein to include without limitation an additional inner closed curve of pixels within a closed curve or a contour. For example FIG. 25 shows the closed curve or contour of the letter image "O", pixel A is on the contour or closed curve and the inner loop is within this contour or closed curve.

The term "controller" should be construed herein to include without limitation a computer, a processor, a programmer and the like.

A "peak extrema", a "minima extrema" and an "extrema" may refer to a single pixel point, a plurality of those single pixel points or a short segment of pixels defining the aforementioned convex attribute and being contiguous with the given extrema pixel point.

The present disclosure refers to a number of documents which are incorporated by reference herein in their entirety.

The foregoing and other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 20(b) is a graph representing a projection profile on the y-axis;

FIG. 24(a)-24(l) illustrate some samples from a French check database; (a) "quinze", (b) "cinquante", (c) "mille", (d) "cts", (e) "cinquante", (f) "trente", (g) "six", (h) "quinze", (i) "onze", (j) "trois", (k) "seize", (l) "cinq"; and FIG. 25 illustrates a contour pixel image of the letter image "o", showing a pixel point A on the contour or closed curve as well as an inner loop or closed curve.

DESCRIPTION OF ILLUSTRATIVE EMBODIMENTS

Figures 1, 2:
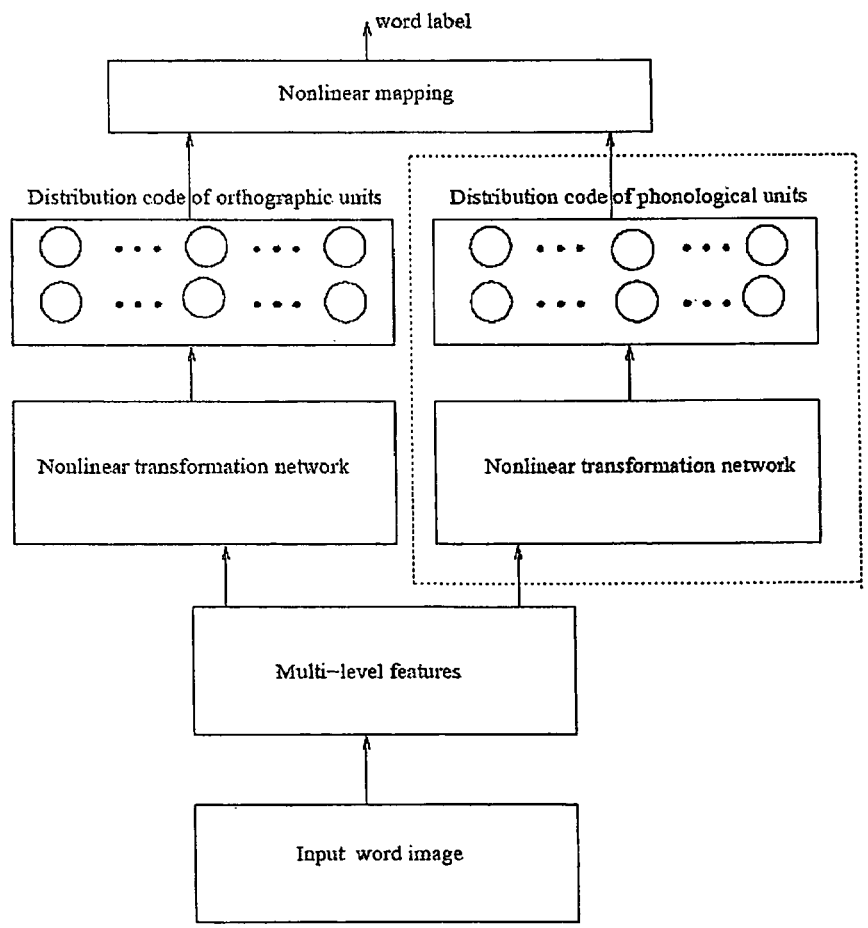
FIG. 1 illustrates some cursive word images; a) "almost", (b) "almost", (c) "almost", (d) "almost", (e) "along", (f) "already", (g) "and", (h) "and", (i) "announce", (j) "another", (k) "answer", (l) "army", (m) "around", (n) "art", (o) "care", (p) "case".
FIG. 2 is a schematic block diagram of a transformation network that directly encodes orthographic and phonological information.
Figure 3:
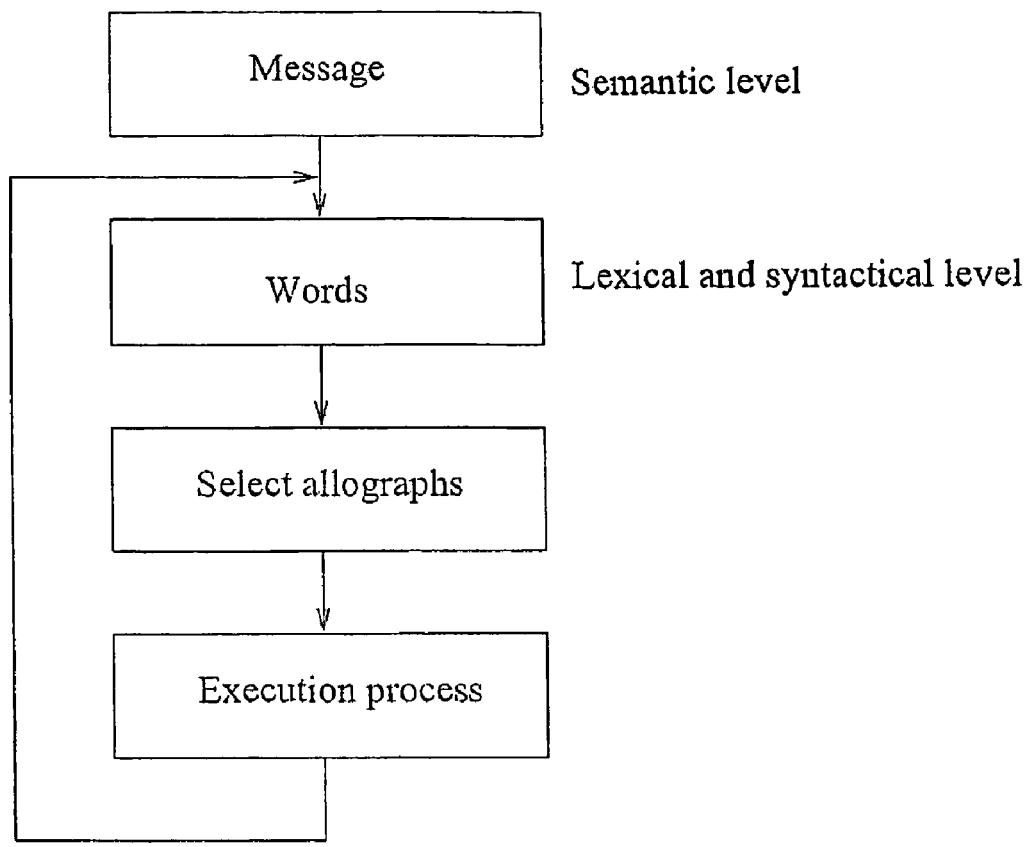
FIG. 3 is a flow chart showing information flow of handwriting production.

The present invention is illustrated in further details by the following non-limiting examples.

The description of non-restrictive illustrative embodiments of the present invention is organized as follows. Section I is a brief introduction. In section II the acquisition of cursive word databases will be described. In section III, two algorithms for word skew/slant correction based on Radon transform are presented. In section IV, a concept framework of low-level word image representation is provided and its relationship with the process of handwriting production is discussed as well as some principles in vision and psychology. In sections V and VI the detailed algorithms are proposed to implement the above representation. In section V, an algorithm to locate those meaningful extreme points and build a classifier based on support vector machine to classify them into two independent channels is proposed. In section VI, a sequence of feature vectors are extracted at those extreme points in each channel, respectively. Dynamic time wrapping is used to evaluate the performance of the proposed representation. Experimental results are given in section VII and show the effectiveness of the proposed low-level word image representation. Finally, section VIII is a brief conclusion.

I—Introduction

In accordance with an embodiment of the present invention, certain extreme points in the vertical direction on a contour are located, and then support vector machines are applied to classify those points into two channels: local peaks in the upper external contour and local minima in the lower external contour. For classification, local feature vectors are extracted at those points. As a result, a cursive word image is represented by two sequences of feature vectors.

A perceptive global approach to word recognition is used. This approach provides for uncovering the modular parameters of handwritten word images and as such for the mathematical modulation of word images that are sought to be recognized. Hence, a low-level word image representation for classification is provided, where a word image can be represented as one sequence of peak feature vectors on the upper zone and one sequence of minima feature vectors in the lower zone. The representation conforms to the Gestalt principles of perceptual organizations and is very suitable for the development of hierarchical learning systems when the top-down information such as orthography is used. A complete recognition system based on this representation is provided. Also, efficient and robust algorithms for word skew and slant corrections are provided. In a non-limiting illustrative example, the recognition rates on IRONOFF French check database and IMDS cursive word database are 94.3% and 56.1% respectively when the matching method of dynamic time wrapping is used.

II—Description of Aquisition of Cursive Word Database

A database with large amounts of data allows for building a handwriting recognition system. When more and more recognition methods are available, the performance comparison of these methods on benchmark databases are becoming increasingly important. Although several public databases are available for academic research [37], the shortcoming with these databases is that lexicon is small or less controlled. For example, IRONOFF French check database [38] contains thirty words. The underlying lexicon in IAM databases [39] includes 10,841 different words. But this lexicon contains many word inflections. Identifying word inflections may require the contextual information in a sentence. Since the cursive word recognition rate without constraints for the current recognition system is still rather low, it is better to build a database in which the lexicon is increasing in a proper way so that one can investigate the factors that affect the recognition performance in a controlled manner.

Before collecting handwritten word samples, the following three questions have to be considered: First question: Which words are chosen? Second question: How many samples of each word are required to be collected? Third question: How can we design a form such that word labelling is automatic?

For the first question, words are chosen in terms of rankings of their frequencies since psychology research has shown that humans read texts with highly frequent words more fluently. From a viewpoint of Bayesian learning, the word frequency appears in the expression of a Bayesian classifier. The Collins English dictionary for Advanced Learners [40] provides a good resource for word frequency. The frequency in the dictionary is calculated in a large corpus, called Collins Bank of English, which is a collection of around 400 million words of written and spoken English and covers many sources such as texts from newspapers, television, British and American English and other sources. Information on the frequency of words is given using five frequency bands. The most frequent words have Band 5, the next most frequent, Band 4, and so on. Words which occur less frequently do not have a frequency band. Table I shows the number of words in five frequency bands. The words in the five frequency bands make up 95% of all spoken and written English and the words in the top two bands account for about 75% of all English usage. Therefore, word frequency is a good measure for selection. In the first stage, words in frequency Band 5 are collected. After good progress has been made, we continue to collect words in other frequency bands. Inside each frequency band, about the same number of samples is collected for each word. The higher the frequency band is, the more samples we collect. As a result, samples in the database show how often words are used in real life. Moreover, the recognition system becomes more complex when more words in the low frequency bands require to be recognized. This simple-to-complex strategy facilitates the research of cursive word recognition.

TABLE I

NUMBER OF WORDS IN EACH FREQUENCY BAND

| | Band 5 | Band 4 | Band 3 | Band 2 | Band 1 |
|---|---|---|---|---|---|
| Word | 680 | 1040 | 1580 | 3200 | 8100 |

For the second question, there is no simple answer to it since the size of samples depends on many factors such as the discriminative ability of features and the complexity of the classifier in order to achieve a good generalization performance. Although a large amount of data is always preferable, sample collections are costly. Currently, we decide to collect about 2,000 handwritten samples for each word in frequency Band 5. The samples are written by a variety of persons from different ethno-linguistic backgrounds such as Arabic, Asian, Canadian, French, from various vocations such as students, university professors, corporate employees and others. No constraints are imposed on the writers in order to obtain the most natural handwritten samples.

For the third question, in order to label words automatically, an electronic form has been designed having the following features: given a number of words; handwritten collection forms (e.g. Microsoft Word format) can be generated automatically; handwritten words in the form image can be segmented robustly and easily; and word labelling is automatic by high-accuracy machine-printed digit recognition techniques.

Figures 5, 6:
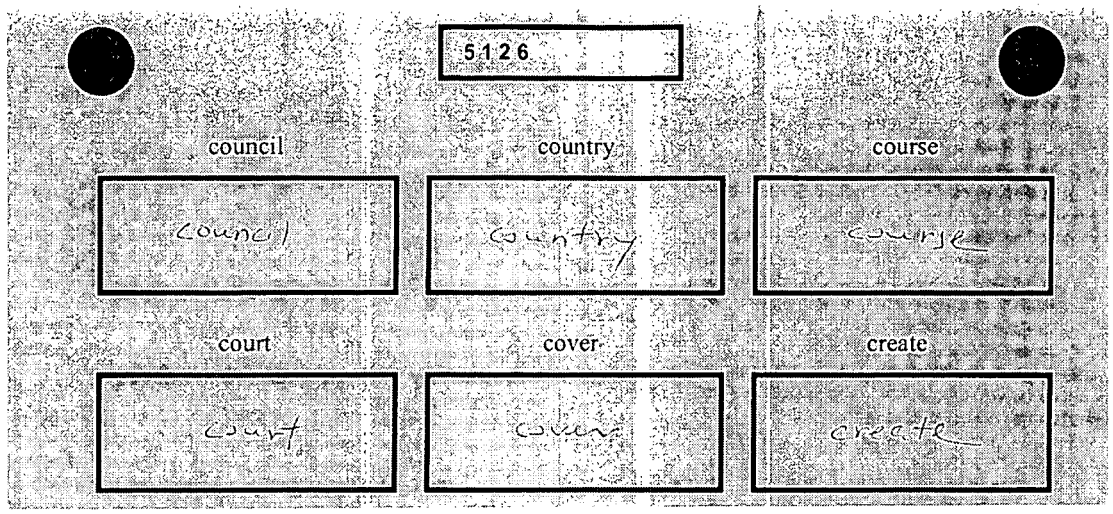
FIG. 5 is a part of electronic form.
FIGS. 6(*a*)-6(*l*) illustrate respective samples of cursive word database: (a) "daughter", (b) "and", (c) "announce", (d) "another", (e) "army", (f) "around", (g) "before", (h) "black", (i) "daughter", (j) "and", (k) "begin", (l) "before"

FIG. 5 shows a part of the electronic form that is used to collect samples. The form is scanned for example as a gray-scale image in 300 DPI. The two black circles are used as the reference points to de-skew the image. All boxes can be located robustly by connected component analysis. In the top box, some digits are printed. For example, 5 1 2 6 are shown in the box. The first digit "5" specifies the frequency band "1 2 6" represents the sequential number of the first word in the current page so that we can create an index table to label the word automatically. Digits are printed in bold font and separated by one blank space for ease of segmentation. Each digit image will be recognized by a high-accuracy machine-printed digit recognition engine. Some samples are depicted in FIG. 6.

Figure 7:
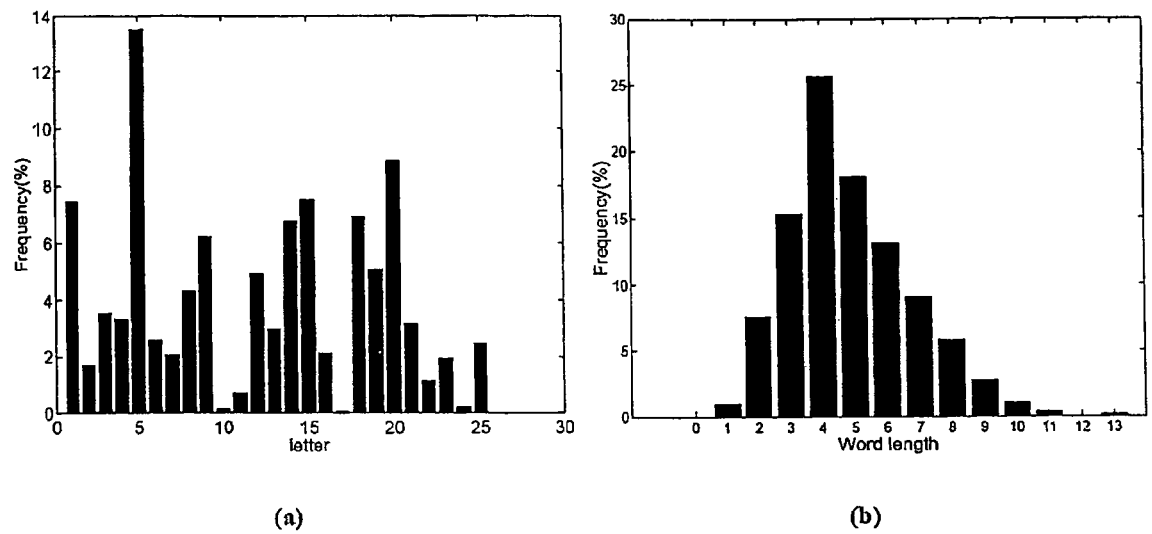
FIG. 7 is a graph representing letter distribution in a database wherein letters are case insensitive and wherein the 26 letters are mapped to 26 integers; letter "a" is mapped to "1", letter "b" is mapped to "2", and so on, and FIG. 7(*b*) is a graph representing word distribution in terms of the length of the words.

Until now, the total number of collected samples is 52528. Since the size of vocabulary is 670, the average number of samples of each word is about 78. These samples are randomly split into training and testing sets. As a result, the training and testing sets consists of 38795 and 13733 samples, respectively. In the training set, letter distribution and word length distribution are shown in FIG. 7. It can be observed that words of length 4 are the most frequent in the training set.

III—Algorithms for Word Skew and Slant Correction

An algorithm for skew correction and a fast algorithm for slant correction are proposed. Both algorithms are based on Radon transform [41]. Compared with previous methods, they are not only robust but also computationally efficient while the principle of computational efficiency usually is not taken into account in the previous methods.

A. Algorithm for Slope Estimation

Figure 4:
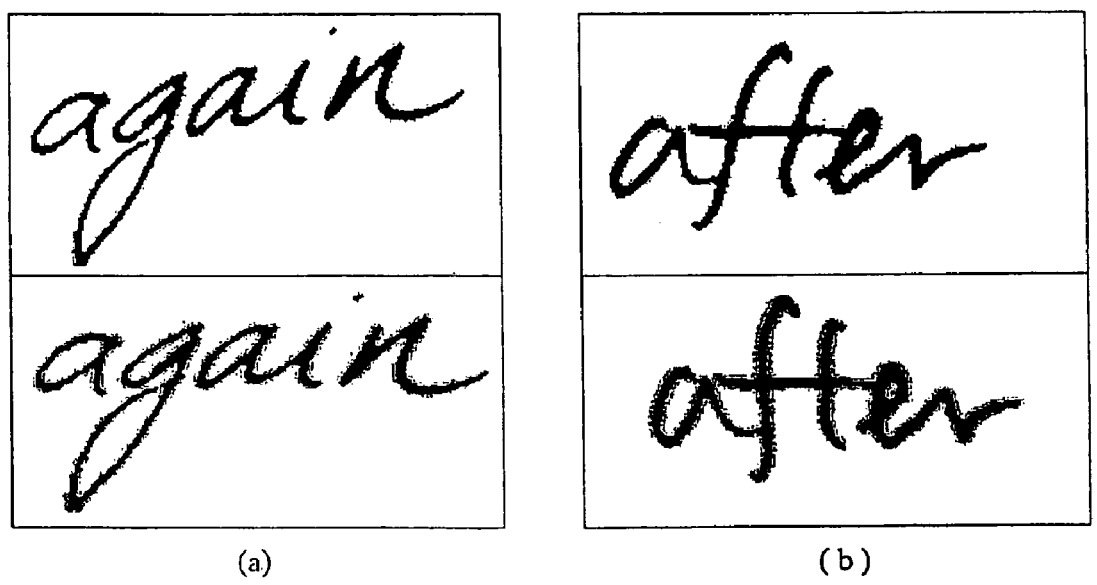
FIG. 4(*a*) illustrates an original handwritten word image and the same word image after skew correction, and FIG. 4(*b*) illustrates an original word image and the same word image after slant correction.
Figure 8:
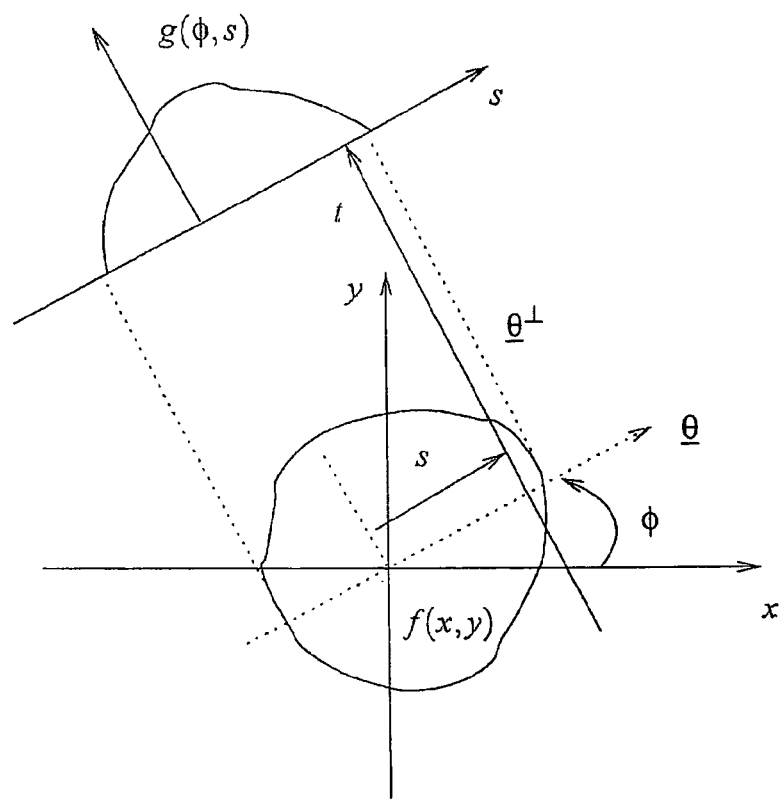
FIG. 8 is a graph illustrating parameters in the definition of radon transform.

Intuitively, it can be observed in FIG. 4 that a handwriting signal oscillates the most frequently in the writing direction. For a binary word image (a black/white image; the foreground being defined by black pixels) edge and foreground pixels characterize the shape variations and image energy, respectively. When two signals are projected onto the axis orthogonal to the writing direction, the correlation is maximized. Before this problem is formalized, it is useful to introduce some notations. The 2D image is denoted as f(x,y). The Radon transform [41] of f is the integral of f(x,y) over a line in the xy-plane, which is illustrated in FIG. 8. Mathematically, the radon transform of f is given by:

$$R\{f\} \equiv g(\phi, s) \qquad (2)$$
$$= \int_{-\infty}^{\infty}\int_{-\infty}^{\infty} f(x,y)\delta(s-(x\cos\phi + y\sin\phi))dxdy$$

where δ is Dirac delta function. With the change of variables defined by $$\begin{bmatrix} x \\ y \end{bmatrix} = \begin{bmatrix} \cos\phi & -\sin\phi \\ \sin\phi & \cos\phi \end{bmatrix} \begin{bmatrix} s \\ t \end{bmatrix} \qquad (3)$$

(2) reduces to $$g(\phi,s) = \int_{-\infty}^{\infty} f(s\cos\phi - t\sin\phi, s\sin\phi + t\cos\phi)dt, \qquad (4)$$

where $\phi \in [0,\pi)$, $s \in \mathbb{R}$, $\theta = (\cos\phi, \sin\phi)$ and $\theta^{\perp} = (-\sin\phi, \cos\phi)$. The Radon transform of gradient flow is defined by $$g'(\phi,s) = \int_{-\infty}^{\infty} |\text{grad} f(s\theta + t\theta^{\perp}) \cdot \theta^{\perp}| dt \qquad (5)$$

Figure 9:
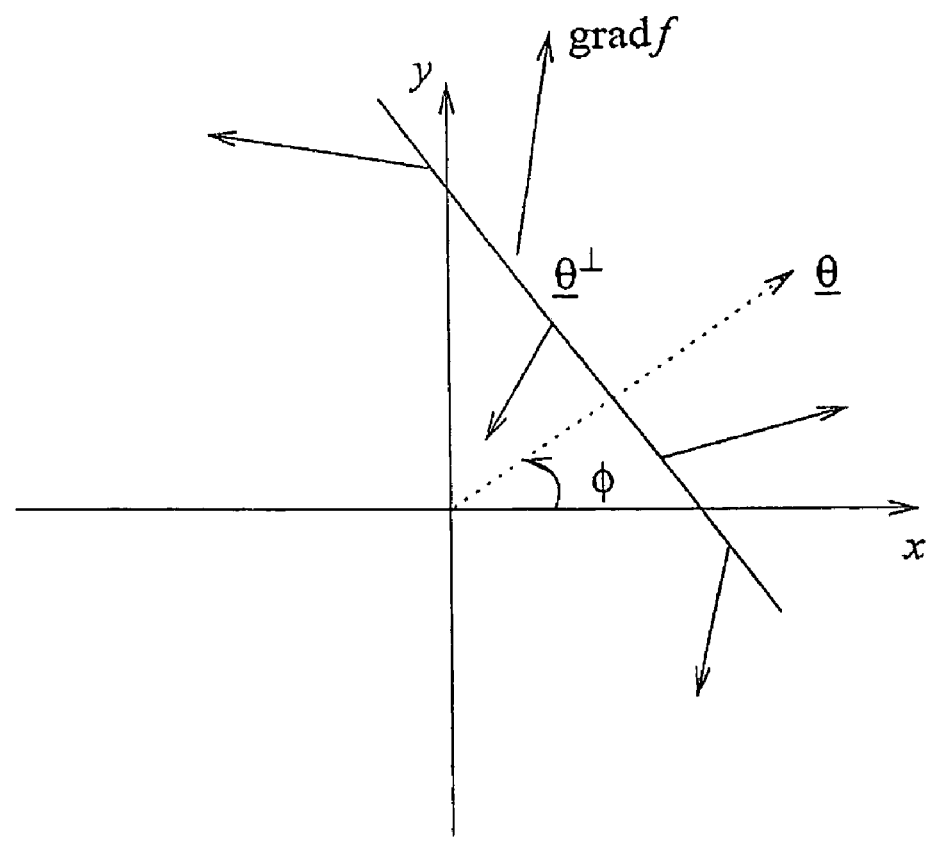
FIG. 9 is a graph of the radon transform of gradient flow in $IR^2$, wherein the gradient vector components parallel to the line of integration are used.

This transform is depicted in FIG. 9. For a binary handwritten word image, the Radon transform of gradient flow is mainly used to estimate the average frequency in the projection direction. The angle $\phi^*$ can be obtained by maximizing the following function:

$$\phi^* = \arg\max_{\phi} \int_{-\infty}^{\infty} g(\phi,s)g'(\phi,s)ds \qquad (6)$$

Finally, when a handwritten word image is de-skewed, $\theta^{*\perp}$ should correspond to the x axis. Therefore, the skew angle is $\pi/2+\phi^*$. In order to solve the optimization in (6), an efficient algorithm will be required. The image width and height of image f(x,y) are denoted by w and h, respectively. f(x,y) is a black/white (1/0) image. The input image is mapped from the Cartesian domain to the polar domain, where $$x - \frac{w}{2} = r\cos\alpha \text{ and } y - \frac{h}{2} = r\sin\alpha,$$

Figure 10:
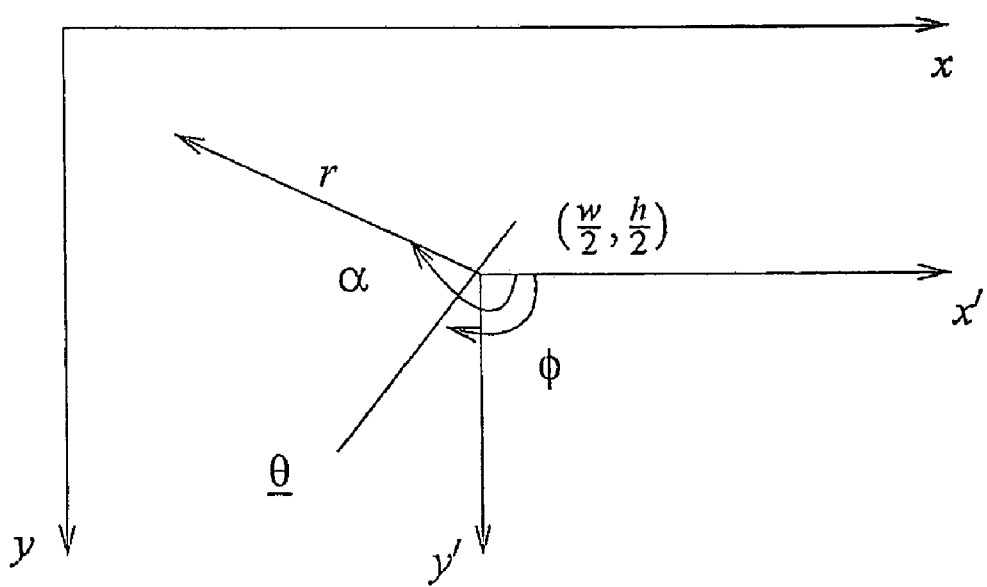
FIG. 10 is a graph illustrating Radon transformation in the polar domain.

$\alpha \in [0,2\pi)$ and $r \leq r_{max}$. In order to reduce the computational cost, zero-crossing is used to approximate $|\text{grad} f(s\theta + t\theta^{\perp}) \cdot \theta^{\perp}|$ in Eq.(5). In the binary image, zero-crossing occurs in the edge point. Then $g'(\phi,s)$ represents the number of crossing points parameterized by $\phi$ and s. FIG. 10 illustrates Radon transformation in the polar domain. When the foreground pixel (r,α) is projected onto the unit vector $\theta$, its value is given by $$(r\cos\alpha, r\sin\alpha) \cdot (\cos\phi, \sin\phi) = r(\cos\alpha\cos\phi + \sin\alpha\sin\phi) \quad (7)$$
$$= r\cos(\alpha - \phi)$$

The following is an example of efficient algorithm to detect the skew angle.

Fast Algorithm for Skew Angle Detection

---

Input: Input image f(x,y), K =⌈$r_{max}$⌉. matrix A[K][360], matrix B[2K][2K], vector $v_1$[2K], fvector $v_2$[2K]and vector $v_3$[180]. The foreground points $\{(x_i^f,y_i^f)\}$, i = 1,...,M; the edge points $\{(x_j^e,y_j^e)\}$, j=1,..., N.
Output: skew angle
Initialization: Pre-compute the caching tables
  1.1 For i =1 to K step 1
    For j =1 to 360 step 1
      A[i][j]=⌊i × cos(π/180×j)+K⌋
    End j
  End i
  1.2 For j =1 to 2K step 1
    For i =1 to 2K step 1
      l =⌊√((i-K)²+(j-K)²)⌋
      m=⌊(atan2(j − K,i − K)+π)×180/π⌋
      B[j][i].r=l
      B[j][i].α=m
    End i
  End j
Radon transform in the polar domain
  2.1 For j =1 to 180 step 1
    $v_1$[i] ← 0, $v_2$[i] ← 0, i =1,...,2K.
    For i=1 to M step 1
      x ← K + $x_i^f$
      y ← K + $y_i^f$
      r=B[y][x].r
      α=B[y][x].α
      k=A[r][(360 +α−j)mod 360]
      $v_1$[k] ← $v_1$[k]+1
    End i
    For i =1 to N step 1
      x ← K + $x_i^e$
      y ← K + $y_i^e$
      r=B[y][x].r
      α=B[y][x].α
      k=A[r][(360 +α−j)mod 360]
      v2[k] ← v2[k]+1
    End i
    Smooth $v_1$ and $v_2$ using moving window of size 5.
    $v_3$[j] ← 0
    $v_3$[j] ← $v_3$[j]+$v_1$[i]×$v_2$[i], i =1,...,2K
  End j
Calculate maximal value
  3.1 i* =arg max $v_3$[i], i =1,...,180.
  3.2 return i*[3] +90.

---

[3]Note that the origin of the coordinate system is (w/2,h/2).

In the above algorithm, most float operations are replaced with integer ones. Although the precision of Radon transform is reduced, the detection accuracy of the skew angle is not decreased. The reason is that in step (3.1) an angle which corresponds to the maximum response is obtained. High-precision Radon transform is not necessary in our algorithm. In addition, the most expensive operations can be pre-computed as look-up tables in the initial stage and the number of evaluated angles can be much smaller than 180.

B. Fast Algorithm for Slant Estimation

Figure 11:
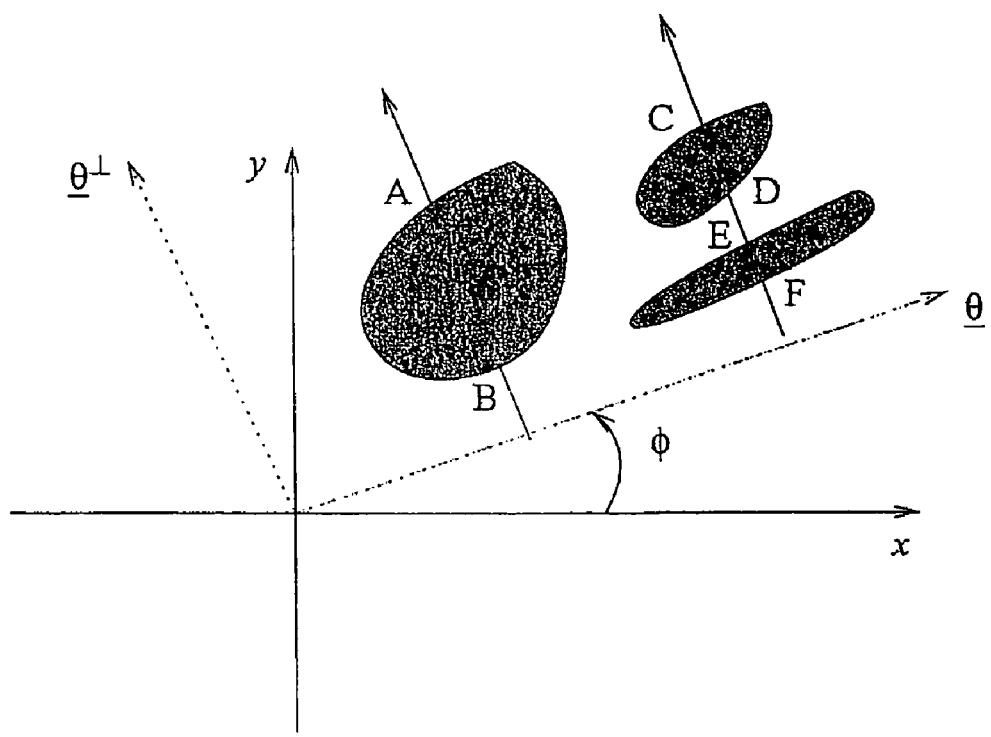
FIG. 11 is a graph illustrating slant angle detection.

The basic idea of slant correction is to estimate the average angle of long vertical strokes. FIG. 11 can be used to give a geometric explanation. In FIG. 11, line segment AB is a part of long vertical stroke; CD and EF are a part of two short vertical strokes, respectively. In order to classify two cases, AB, CD, EF are projected onto the direction $\theta^\perp$. Then the ratio of the projection length to the maximal range for the fixed s in (2) is calculated using the expression:

$$r(\phi, s) = \frac{g(\phi, s)U(g(\phi, s) - \tau_1)}{\max_t\{t \mid f(s\theta + t\theta^\perp) > 0\} - \min_t\{t \mid f(s\theta + t\theta^\perp) > 0\}}, \quad (8)$$

where $\tau_1$ is a tolerance parameter and the function U(.) is given by $$U(x) = \begin{cases} 1 & \text{if } x > 0 \\ 0 & \text{otherwise} \end{cases} \quad (9)$$

If the ratio r is large, then probably there exists a long segment for the fixed s on current projection direction. For example, for segment AB, the ratio is 1.0; For segments CD and EF, the ratio is (CD+EF)/CF. Let I(φ,s) be an indicator function. It is defined by $$I(\phi, s) = \begin{cases} 1 & \text{if } r(\phi, s) > \tau_2 \\ 0 & \text{otherwise} \end{cases} \quad (10)$$

where $\tau_2$ is a tolerance parameter. Then the following formula is used to approximate the slant angle:

$$\phi^* = \frac{\int_0^\pi \int_{-\infty}^\infty I(\phi, s)g(\phi, s)\phi d\phi ds}{\int_0^\pi \int_{-\infty}^\infty I(\phi, s)g(\phi, s)d\phi ds}, \quad (11)$$

Fast Algorithm for Slant Angle Detection

---

Input: deskewed image f(x,y), K =⌈$r_{max}$⌉. matrix A[K][360], matrix B[2K][2K], vector $v_1$[2K], vector $v_2$[2K], vector min_v[2K] and vector max_v[2K], and vector $v_3$[180]. The foreground points [4] $\{(x_i^f,y_i^f)\}$, i=1,...,M ; the edge points $\{(x_j^e,y_j^e)\}$, j =1,...,N.
Output: skew angle
Initialization: Pre-compute the caching tables
  1.1 For i =1 to K step 1
    For j=1 to 360 step 1
      A[i][j]=⌊i × cos(π/180×j)+K⌋
    End j
  End i
  1.2 For j =1 to 2K step 1
    For i =1 to 2k step 1
      l = ⌊√((i-K)²+(j-K)²)⌋
      m = ⌊(atan2(j −K, i −K)+π)×180/π⌋
      B[j][i].r=l
      B[j][i].α =m
    End i
  End j
Radon transform in the polar domain
  2.1 totalSum ← 0; AccumulatedAngle ← 0
  2.2 For j =1 to 180 step 1
    $v_1$[i] ← 0, $v_2$[i] ← 0, i=1,...,2K.
    For i =1 to M step 1
      x ← K + $x_i^f$
      y ← K + $y_i^f$
      r = B[y][x].r
      α = B[y][x].α
      k =A[r][(360 +α − j)mod 360]
      $v_1$[k] ← $v_1$[k]+1
    End i
    min_v[i] ← 0, max_v[i] ← 0, i=1,...,2K.
    For i = 1 to N step 1
      x ← K + $x_i^e$
      y ← K + $y_i^e$
      r =B[y][x].r
      α =B[y][x].a -continued

```
    k₁ =A[r][(360 +α - j) mod 360]
    k₂ =A[r][(450 +j - α ) mod 360]
    If k₂ < min_v[k₁] then min_v[k₁] ← k₂
    If k₂ > max_v[k₁] then max_v[k₁] ← k₂
  End i
  v₂[i] ← max_v[i] - min_v[i],i=1,...,2K.
  Smooth v₁ using moving window of size 5.
  sum ← 0
  For i =1 to 2K step 1
    if v₁[i] > τ₂ × v₂[i] and v₁[i] > τ₁ then
      sum ← sum + v₁[i]
    End
  End i
  totalSum ← totalSum + sum;
  AccumulatedAngle ← AccumulatedAngle × j
End j
```

Calculate Average Slant Angle 3.1 return 90-AccumulatedAngles/totalSum.

In the above algorithm, the vector $v_1$ corresponds to g in Eq.(2) and $v_2$ corresponds to the denominator in Eq.(8).

IV—Framework of Low-Level Word Image Representation

Extreme points play an important role from the perspective of handwriting production. In the process of handwriting production, strokes are basic units and a handwriting signal can be represented as a sequence of strokes in the temporal dimension. A stroke is bounded by two points with curvature. That is, strokes are separated by extreme points and a handwriting signal can be broken up into strokes under the assumption of contiguity. In terms of an oscillatory motion model of handwriting [22], the horizontal and vertical directions (assuming that the vertical direction is orthogonal to the writing direction) are more important than the other orientations. Then strokes are split into two groups: strokes in the upper contour and those in the lower contour. Those strokes are ordered from left to right. This representation has several characteristics:

1) It is compatible with the study in psychology which shows that strokes are basic units of handwriting signals.

2) The neighbouring spatial relationship of strokes is preserved.

3) It is a local representation of word image. It is easier to extract low-level invariant local features.

4) It is a 2D representation.

5) The operations of extracting those strokes are feasible since high-curvature extreme points can be extracted robustly.

Figure 12:
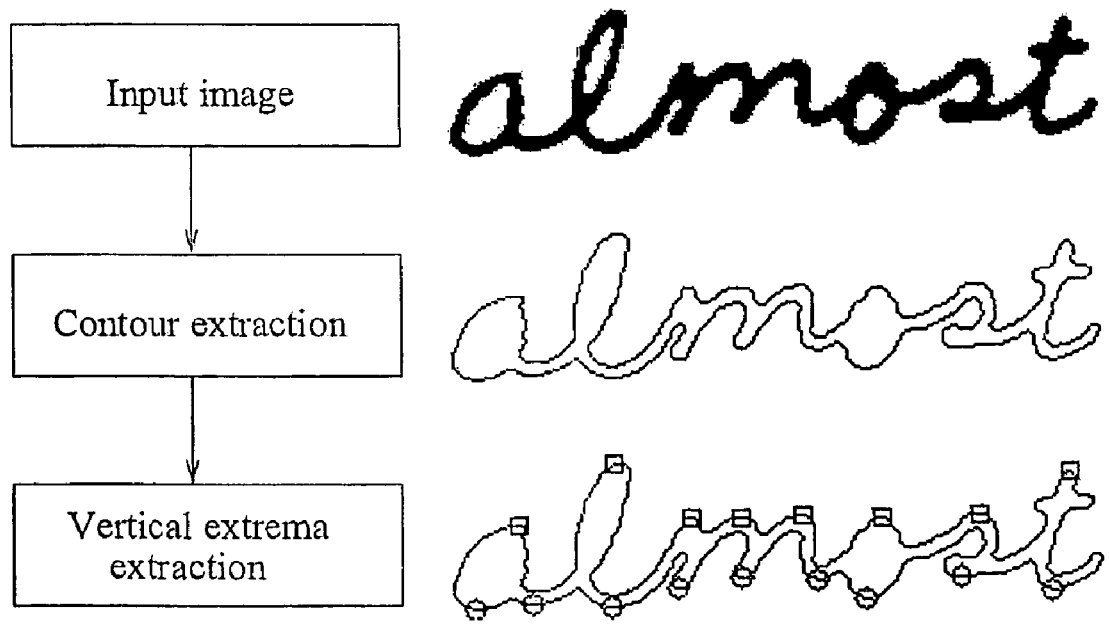
FIG. 12 is a flow chart illustrating vertical extrema on the external contour of a word image, wherein the peaks in the upper contour are marked by rectangles, the minima in the lower contour are marked by circles.

Also, unlike wavelet coding, where an image signal is decomposed into orientation and frequency sub-bands and wavelet coefficients do not correspond to perceptual meaningful units explicitly, more high-level units such as letters and words can be visually constructed from the above representation. As a result, this representation will facilitate building of a hierarchical system of cursive word recognition. In order to obtain the above representation, those interesting points with high curvature are first located. In the writing process, the most important part of a curve seems to be where the writing speed has reached a minimum and curvature reaches a maximum [42][43][31]. The vertical extrema on an external contour are the segmentation points of handwritten strokes. FIG. 12 shows the procedures of the extraction of vertical extrema. The interesting locations are the peaks in the upper external contour and minima in the lower external contour. The neighbouring curved segments at those extrema have a convex attribute that is either convex with relation to that extrema or concave with relation to that extreme. If the curves are smooth, the curvatures at those points are positive.

Theoretically there exists a point with negative curvature between two neighbouring extrema. This indicates that a point with negative curvature depends on its neighbouring points with positive curvature. Therefore, it is reasonable to assume that peaks in the upper external contours are pairwisely independent. So are the minima in the lower external contours. Also, these locations are analogous to the centers of receptive fields [44], which attract visual attention [45].

The spatial configuration of those extreme points usually approximates the basic topology of a word image. Separating these extrema into two groups has the following advantages:

2D spatial configuration of these extrema can be approximated by two 1D spatial configurations. Consequently the problem related to complexity will be greatly reduced.

It conforms with the Gestalt principles of perceptual organization: proximity principle (vertical distances) and similarity (local curve shape at these points).

When the signal similarity is modeled independently and signals in one group are degraded, the model in the other group is not affected.

Besides the spatial configuration of these extreme points, some topological constraints have to be represented by features at those points. For example, for the inner contour as a loop, we associate it with the closest extrema on the external contour.

Figure 13:
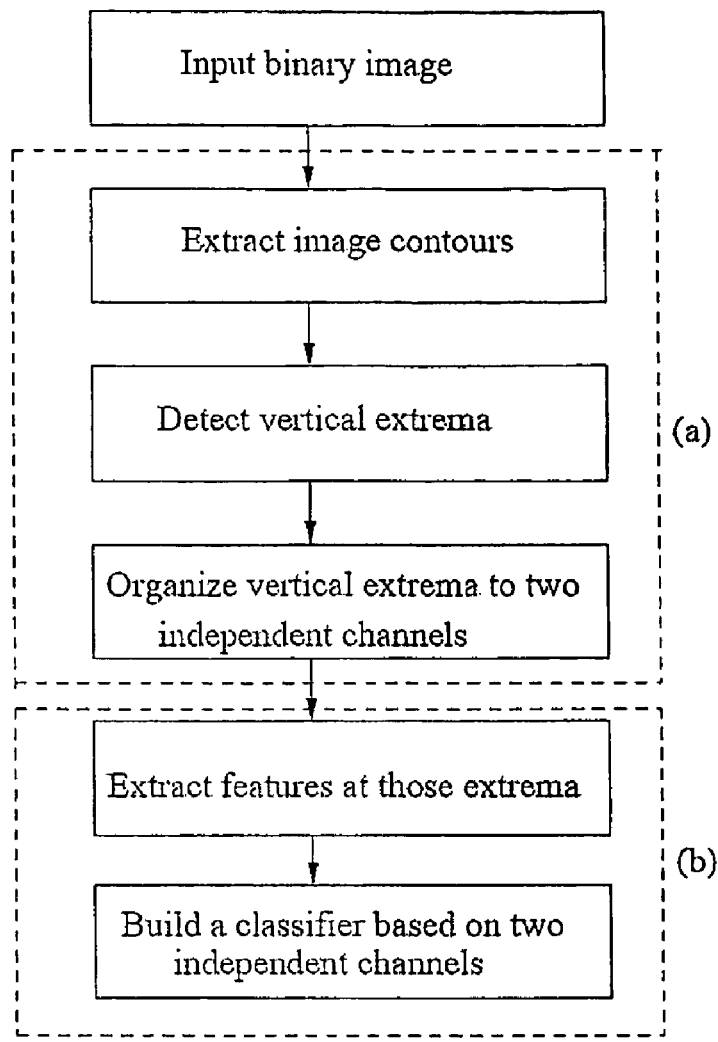
FIG. 13 is a flow chart illustrating the conceptual framework of low-level word image representation, wherein the virtual box (a) contains modules which encapsulate where the important information exists and how to organize them, and the virtual box (b) contains modules which encapsulate what kind of information will be required in order to build a decision model for classification task.

In summary, the representation of FIG. 12 can be illustrated in FIG. 13.

This proposed conceptual representation framework, which differs from the methods in the literature, explicitly and systematically organizes low-level visual information based on some principles from handwriting production, vision and psychology.

V—Detection and Classification of Extreme Points

A. Detection of Extreme Points

Based on the representation framework in section III, an algorithm to detect vertical extrema on the image external contours robustly has been developed. In order to express pixel locations in an image, a Cartesian coordinate system is defined. In this coordinate system, an image is treated as a grid of discrete elements. The top-left corner is chosen as the origin. The x coordinate increases to the right and y coordinate increases to the bottom. Pixel coordinates are integer values. This coordinate system is used in the rest of the paper unless mentioned otherwise. After the coordinate system has been defined, the proposed algorithm is given below:

Algorithm for Detection of Vertical Extrema

```
Input: Points of a contour v[i]∈ IR², i =0,..., n-1 and working space
       α[j]∈ Z⁺∪ {0} and b[j]∈ IR, j =0,...,n -1.
Output: peaks and minima
  1 k ← 0
  2 Find the points whose neighboring y coordinates are different
    2.1 For i =0 to n - 1
        Δy ← v[i].y - v[i +1].y
        If Δy ≠ 0, then { b[k] ← Δy; α[k] ← i ; k ← k +1}
      End for
  3 Median filtering of window size 3 is applied to vector b.
  4 Construct index vectors of extrema P and M
    4.1 n₁ ← 0, n₂ ← 0
    4.2 For j =1 to k
        If b[j]<0, then { P[n₁] ← α[j],n₁ ← n₁ +1 }
        If b[j]>0, then { M[n₂] ← α[j],n₂ ← n₂ +1 }
      End for
  5 Prune invalid minima indexed by set M iteratively.
  6 Prune invalid peaks indexed by set P iteratively.
```

Figure 14:
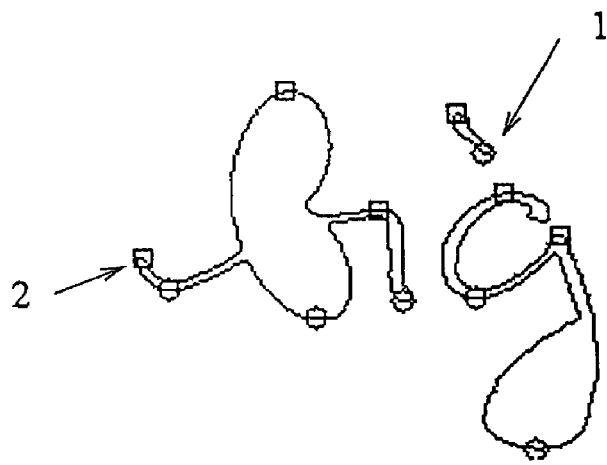
FIG. 14 is a schematic illustration of pruned extrema, wherein local minima 1 is in the upper contour and local peak 2 is in the lower contour.

In the above algorithm, a contour is assumed to be external and closed. At step 4.1 and 4.2, $n_1$ and $n_2$ denote the number of initial peaks and number of initial minima, respectively. At step 5 and 6, three primary measures are used to prune invalid extreme points: contour length, height difference and bounded variation between two neighbouring extreme points. For example, if the contour length between two neighbouring peaks is small, they will be merged into one peak that will be located at the middle point on the contour. Also, if a local minimum point is located in the upper zone, it will be pruned. In the same manner if a local peak point is located in the lower zone, it will be pruned. For instance, in FIG. 14, extreme points 1 and 2 will be pruned.

B. Group Extreme Points

Figure 15:
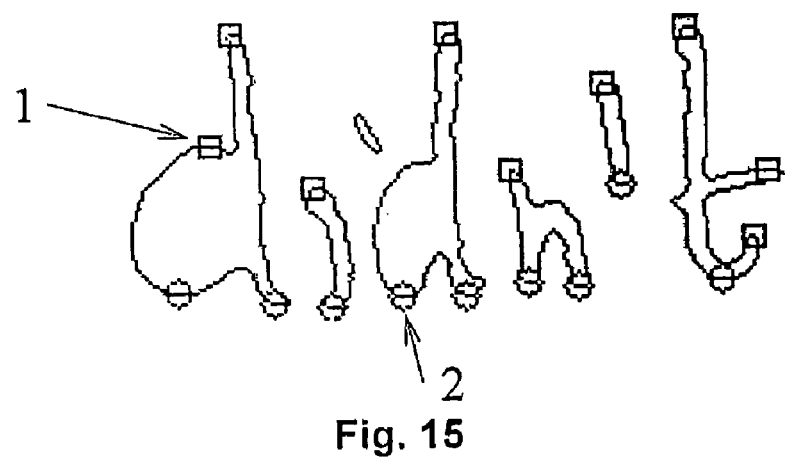
FIG. 15 is a schematic illustration for the extraction of a number of peaks and minima.
Figure 19:
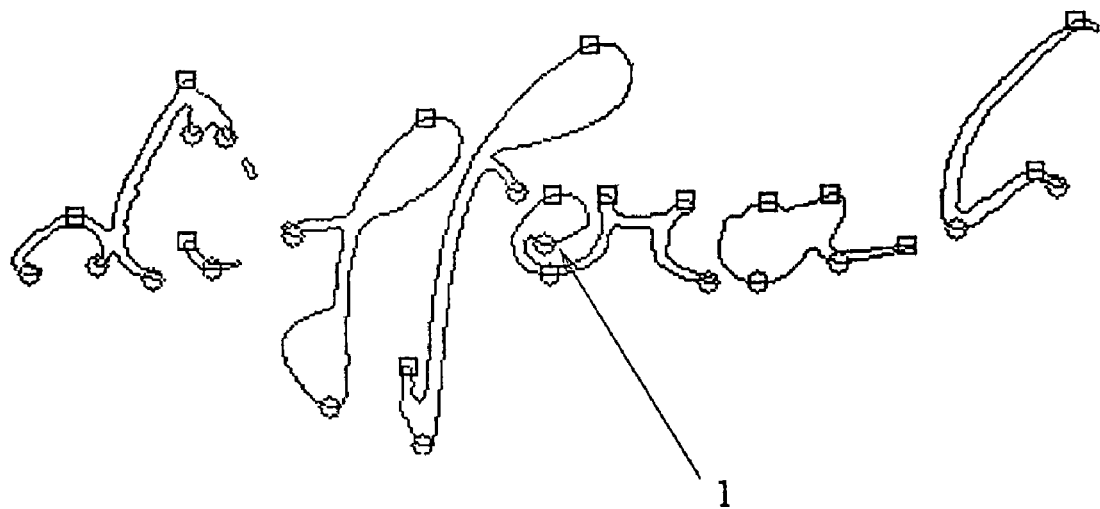
FIG. 19 is a schematic illustration for the extraction of vertical intersection distance.

Although the algorithm in subsection V.A. can be applied to group of peaks and minima and prune invalid extrema, it is still not good enough due to various variations of word shapes. Therefore, a classifier is built to refine the grouping and pruning process. Several features are extracted at each extreme point. With reference to FIG. 19, these features are listed as follows:

1) Number of local minima on the current closed curve of the word image contour ($f_1$). In FIG. 15, the feature values at points 1 and 2 are 2.

2) Number of local peaks on the current closed curve of the word image contour ($f_2$). In FIG. 15, the feature values at points 1 and 2 are 2 and 1, respectively.

Figure 16:
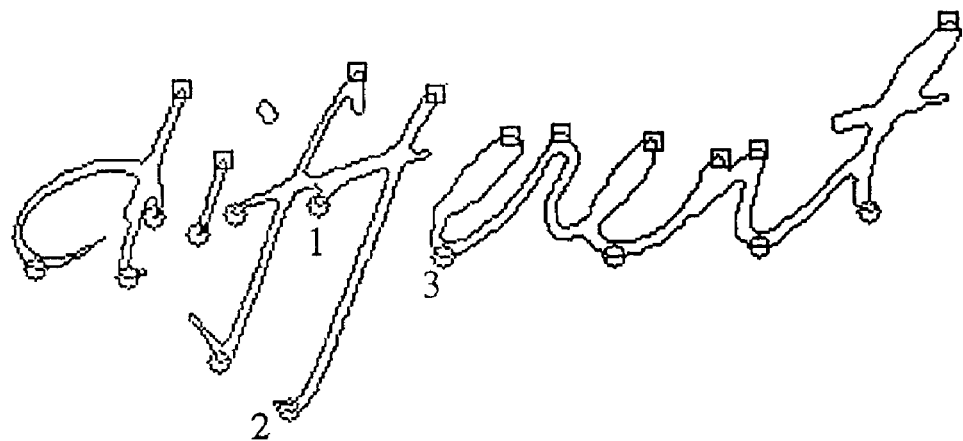
FIG. 16 is a schematic illustration for the extraction of minimum height difference, wherein the neighbours have the same convex attributes as the current extreme point.

3) Minimum height difference with neighbouring extrema ($f_3$). When the current point is a local minimum, the two neighbours are local minima; when the current point is a local peak, the two neighbours are local peaks. Neighbours may not be on the same closed curve of the word image contour as the current one. In FIG. 16, the feature value at point 2 is min $(|y_1-y_2|,|y_3-y_2|)$.

Figure 17:
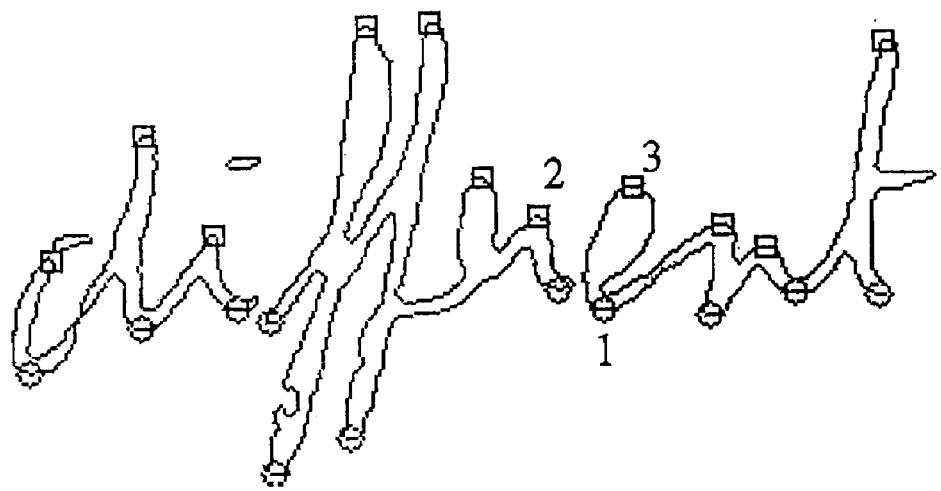
FIG. 17 is a schematic illustration for the extraction of minimum height difference, wherein the neighbors have different convex attribute from the current extreme point.

4) Minimum height difference with neighboring extrema ($f_4$). When the current point is a local minimum, the two neighbours are local peaks; when the current point is a local peak, the two neighbours are local minima; Neighbours may not be on the same closed curve of the word image contour as the current one. In FIG. 17, two neighbors of point 1 are 2 and 3. The feature value at point 1 is min $(|y_1-y_2|,|y_3-y_1|)$ 5) Percent of peaks above the current point ($f_5$).

6) Percent of minima below the current point ($f_6$).

7) Relative position in y axis ($f_7$). The feature is defined by y/h, where y is the coordinate of the current point in the y-axis and h is the image height.

8) Minimum contour portion length with neighbouring peaks ($f_8$). Note that neighbouring peaks are on the same contour as the current point.

9) Minimum contour portion length with neighbouring minima ($f_9$). Note that neighbouring minima are on the same contour as the current point.

10) Minimum height difference with neighbouring peaks ($f_{10}$). The neighbouring peaks must be on the same closed curve of the word image contour as the current point.

11) Minimum height difference with neighbouring minima ($f_{11}$). The neighbouring minima must be on the same closed curve of the word image contour as the current point.

Figure 18:
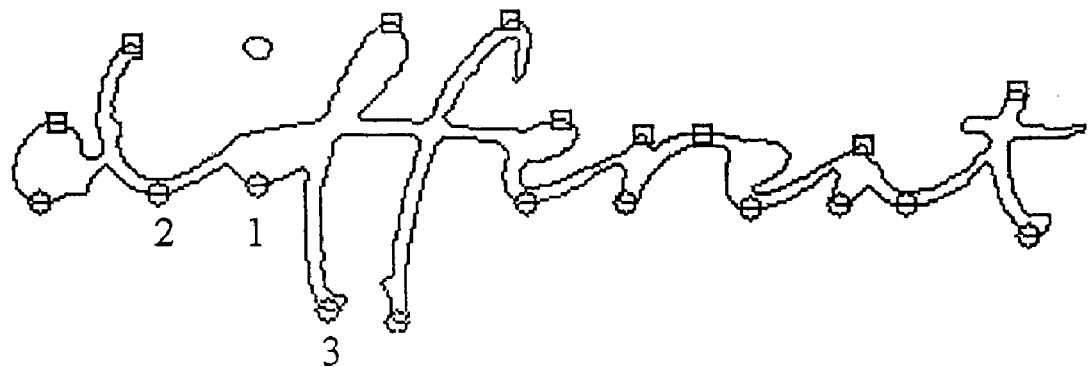
FIG. 18 is a schematic illustration for the extraction of height ratio.

12) Height ratio with neighbouring extrema ($f_{12}$). In FIG. 18, the two neighbors of point 1 are 2 and 3. Point 3 is the lowest point among the three points. Let $y_{c1}$ be the y-coordinate of top-left corner of a closed curve of the word image contour where point 1 is located. Let $y_{c3}$ be the y-coordinate of the top-left corner of a contour where point 3 is located. The ratio is defined by $(y_1-y_{c1})/(1.0+y_3-y_{c3})$.

13) Vertical intersection distance ($f_{13}$). In FIG. 19, point 1 (local minima) is on the upper contour. If we scan horizontally and vertically from point 1, the scanning line will intersect the left contour and lower contour in a short range as will be understood by a skilled artisan. In an embodiment, this short rage is less than about 30 pixels including every interval number of pixels between 30 and 0. In another embodiment, this short range is less than about 2 including every interval number of pixels between 30 and 0. The distance between point 1 and vertical intersection point is the feature value; otherwise this value will be set to the fixed value.

In the above features, $f_1$ and $f_2$ characterize the information of word length. $f_3$ represents the information of the ascender and the descender. For each feature value, a reasonable upper bound will be set. If the feature value is greater than the corresponding bound, it will be rounded to this bound. In biological learning, it is called "peak effect" [46]. Given the specified bound $b_i$ of the feature $f_i$, the round operation is given by $$f'_i=\min(f_i,b_i) \quad (12)$$

For fast learning, the feature values will be first transformed into the interval [0,1], the variable transformation $x^{0.4}$ is applied to each component of the feature vector such that the distribution of each feature is Gaussian-like [47]. The formula is given by $$f''_i = \left(\frac{f'_i}{b_i}\right)^{0.4} \quad (13)$$

Then a support vector classifier [48] is constructed to classify points to two classes: extrema on the upper contour and extrema on the lower contour. If one local minima is classified to the upper contour, it will be pruned. If one local peak is classified to the lower contour, it will be pruned. As a result, the valid local peaks will be on the upper contour while the valid local minima will be on the lower contour.

After valid extrema are selected and grouped into two channels, two sequences of extrema can be constructed: peaks on the upper external contour and minima on the lower external contour. But orders of those extrema in the sequence have to be determined. Given two reference points on a contour, orders of contour points along the contour path are intrinsic and invariant to many transforms. Therefore, in each channel, extreme points are first sorted by their x coordinates in an increasing order. Then extreme points are sorted in the same contour from left to right along the contour path. The dots associated with letters i and j are detected and put at the end of peak sequences VI—Feature Extraction and Classifier Design A. Feature Extraction After valid extrema are classified into two groups, discriminative features will be extracted at those points for word classification task. Some features are global and will be distributed to all extrema in the corresponding channel. The feature extraction is described according to local peaks; similar operations are applied to local minima.

1) Height difference with the neighbouring peak on the left ($f_1^c$).

2) Height difference with the neighbouring peak on the right ($f_2^c$)

3) Relative horizontal position ($f_3^c$). Let the coordinate of the current point be (x,y). The enclosed box of the word image is a rectangle. The coordinate of the top-left corner is $(x_{lt},y_{lt})$ and the width and height of the rectangle are w and h, respectively. The feature is defined by $$f_3^c = \frac{x - x_{lt}}{w} \qquad (14)$$

4) Relative vertical position ($f_4^c$), which is similar to $f_3^c$.

5) Projection ratio in the horizontal direction ($f_5^c$). Project the word image onto the x-axis. Let the projection function be p(x), bounded by the interval [a,b]. The x coordinate of the current point is c. These parameters are shown in FIG. 20(*a*) and defined by:

$$f_5^c = \frac{\int_a^c p(x)\,dx}{\int_a^b p(x)\,dx} \qquad (15)$$

Figure 20A:
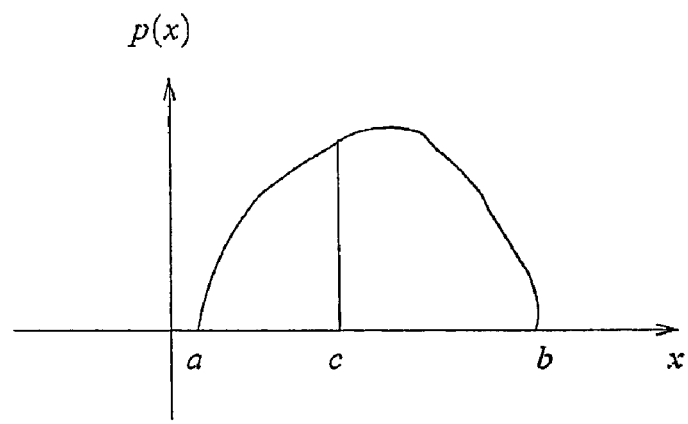
FIG. 20(a) is a graph representing a projection profile on the x-axis.

6) With reference to FIG. 20(*b*), the projection ratio in the vertical direction ($f_6^c$), which is similar to $f_5^c$ is defined by:

$$f_6^c = \frac{\int_a^c p(y)\,dy}{\int_a^b p(y)\,dy}$$

wherein the given extrema is represented by c and having the coordinates (x, y), and p(y) represents the projection function bounded by the y-axis interval [a, b];

7) Maximal height difference of two neighboring peaks ($f_7^c$). This feature characterizes ascender information. It is a global feature.

8) If there is a loop below the current point, $f_8^c$ is set to 1; otherwise it is set to 0.

9) Total number of peaks ($f_9^c$). It is a global feature.

10) Total number of minima ($f_{10}^c$). It is a global feature.

11) Height ratio with neighbouring peaks ($f_{11}^c$). It is the same as $f_{12}$ in subsection V.B.

12) Contour portion length between the current peak and left local minima ($f_{12}^c$).

13) Contour portion length between the current peak and right local minima ($f_{13}^c$).

14) Height difference between the current peak and left local minima ($f_{14}^c$).

15) Height difference between the current peak and right local minima ($f_{15}^c$).

16) Number of pixels with the horizontal orientation on the contour portion between the current peak and left local minima ($f_{16}^c$).

17) Number of pixels with the vertical orientation on the contour portion between the current peak and left local minima ($f_{17}^c$).

18) Number of pixels with the horizontal orientation on the contour portion between the current peak and right local minima ($f_{18}^c$).

19) Number of pixels with the vertical orientation on the contour portion between the current peak and right local minima ($f_{19}^c$).

20) Projection ratio of neighboring local minima on the left in the horizontal direction ($f_{20}^c$). The same operation for feature $f_5^c$ is applied to extract this feature. The difference is that c is the x coordinate of the neighbouring local minima on the left.

21) Projection ratio of neighbouring local minima on the right in the horizontal direction ($f_{21}^c$).

22) Dominant crossing number. Project the vertical crossing number (i.e the transition between a black pixel and a white pixel) onto the x-axis. Then the projection function is quantized to three intervals [0,3], [3,5], [5,+∞]. Then the histogram is calculated when the crossing number falls into the three intervals. The histogram values are features $f_{22}^c$, $f_{23}^c$ and $f_{24}^c$.

23) Crossing ratio in the horizontal direction ($f_{25}^c$). The operation is similar to that for feature $f_5^c$. But the projection is the profile of vertical crossing.

24) Projection ratio of neighbouring local minima on the left in the horizontal direction ($f_{26}^c$). This feature is similar to $f_{20}^c$. The difference is that the projection profile corresponds to the vertical crossing number.

25) Projection ratio of neighbouring local minima on the right in the horizontal direction ($f_{27}^c$).

The above features are extracted to encode the information of local and global context. The normalization operation in subsection V.B is also applied to these features.

B. Dynamic Time Wrapping

Since word images are represented as two sequences of feature vectors, dynamic programming technique [49] can be used to measure the similarity of two word images. The dynamic time wrapping [50] have been applied to speech recognition. In order to mention the model parameters and make the method self-contained, dynamic time wrapping will be briefly described. Let A and B be two sequences of feature vectors:

$$A = x_1, x_2, \ldots, x_i, \ldots, x_I$$

$$B = x_1, x_2, \ldots, x_j, \ldots, x_J$$

Figure 21:
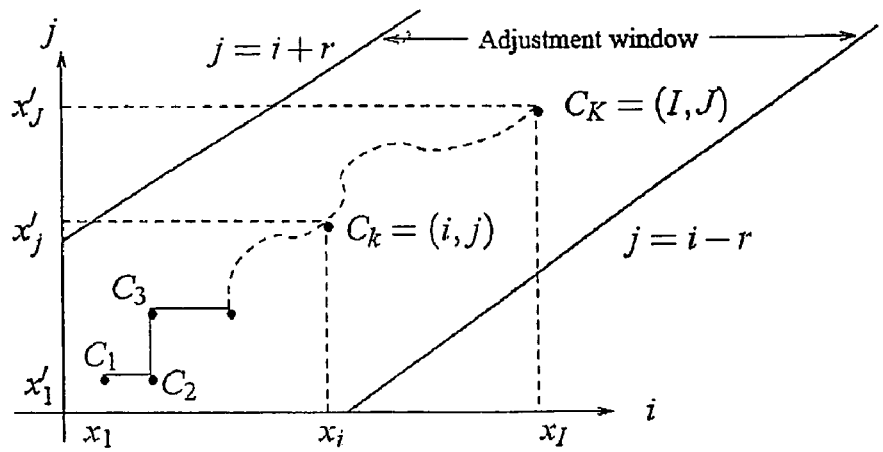
FIG. 21 is a graph illustrating a wrapping function and adjust windows definition.

Consider the problem of eliminating the time difference between two patterns. Let us consider a i-j plane in FIG. 21, where A and B are developed along the i-axis and j-axis, respectively. The time difference can be depicted by a sequence of points c=(i,j):

$$F = c(1), c(2), \ldots, c(k), \ldots, c(K), \qquad (16)$$

where c(k)=(i(k),j(k)).

Figure 22:
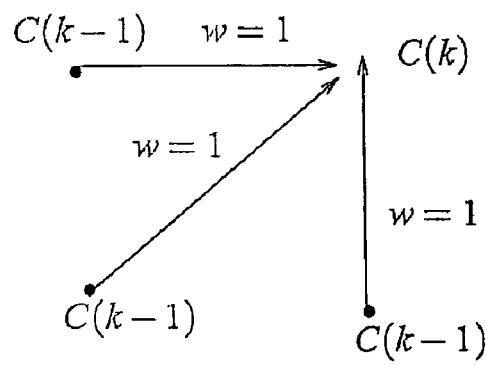
FIG. 22 is a schematic representation of a weighting coefficient w(k) of symmetric form.

The sequence can be regarded as a function which maps the time axis of pattern A into that of pattern B. It is called a wrapping function. A measure of the difference between two feature vectors $x_i$ and $x'_j$, a distance $$d(c) = d(i,j) = \|x_i - x_j'\|, \qquad (17)$$

where $\|.\|$ is a vector norm. The weighted summation of distances on wrapping function F becomes $$E(F) = \sum_{k=1}^{K} d(c(k))w(k), \qquad (18)$$

where w(k) is a non-negative weighting coefficient. The wrapping function F is determined when E(F) attains its minimum value. Some restrictions are imposed on the wrapping function [50]. Symmetric wrapping form is used in our experiment, shown in FIG. 22.

Let $g(I,J) = \min_F [\sum_{k=1}^{K} d(c(k))w(k)]$. The simplified dynamic programming equation is $$g(i, j) = d(i, j) + \min \begin{bmatrix} g(i, j-1) \\ g(i-1, j-1) \\ g(i-1, j) \end{bmatrix} \qquad (19)$$

Initial condition is g(1,1)=d(1,1). The time-normalized distance is g(I,J)/(I×J). In our case, we calculate the time-normalized distance for peaks and minima, respectively. Then the sum of two distances is considered as the matching distance between two word images.

VII. Experiments and Results

The word representation method described in the present specification has been implemented in C++ on Windows XP and compiled by Microsoft visual C++6.0. It is a part of IMDS handwritten word recognition engine. The experiments were conducted on IMDS cursive word database. Training set and testing set consists of 38795 and 13733 word images, respectively. The size of lexicon is 670

In subsection VI.B., the vector norm is set to L1 and the size r of the adjusting window is set to 1. In the remaining section, the performance of the proposed method is first investigated for extrema detection and grouping on IMDS database. Then, the generalization performance of the proposed method is investigated on IRONOFF French cheque database [38] and IMDS cursive databases.

A. Extrema Grouping

A support vector machine (SVM) is used as a classifier to classify extrema into two categories. The radial basis function (RBF) is chosen as the SVM kernel, given by $$K(x, x') = \exp\left(-\frac{\|x - x'\|^2}{0.6^2}\right), \quad (20)$$

where $\|.\|$ denotes Euclidean norm and the dimension of feature vectors x and x' is 13. The upper bounds $b_i$, i=1, ..., 13 of thirteen features in subsection V.B. are shown in Table II.

TABLE II

UPPER BOUNDS $b_i$, i = 1, ..., 13.

| $b_1$ | b2 | b3 | b4 | b5 | b6 | b7 | b8 | b9 | b10 | b11 | b12 | b13 |
|---|---|---|---|---|---|---|---|---|---|---|---|---|
| 13.0 | 13.0 | 70.0 | 70.0 | 1.0 | 1.0 | 1.0 | 120.0 | 120 | 70.0 | 70.0 | 1.0 | 400.0 |

The value of C in the dual form of SVM [48] is set to 10.0. SVM is trained by HeroSvm2 [51][6]. Some labelled samples have to be collected before the support vector machine is trained. The strategy is first to label a small number of extrema in the word images manually. Then these samples are divided into training and testing sets. A SVM classifier is constructed. The classifier is used to label other extrema. The misclassified errors are corrected manually. Since the recognition rate of SVM classifier is very high, more than 99%, the number of manual corrections is small. Much time-consuming cost has been saved. Table III shows the performance of SVM classifier,

TABLE III

PERFORMANCE OF SUPPORT VECTOR MACHINE

| Training set | Testing set | Training rate | Testing rate | SV | BSV |
|---|---|---|---|---|---|
| 354,928 | 119,825 | 99.78% | 99.6% | 4377 | 2936 |

Figure 23:
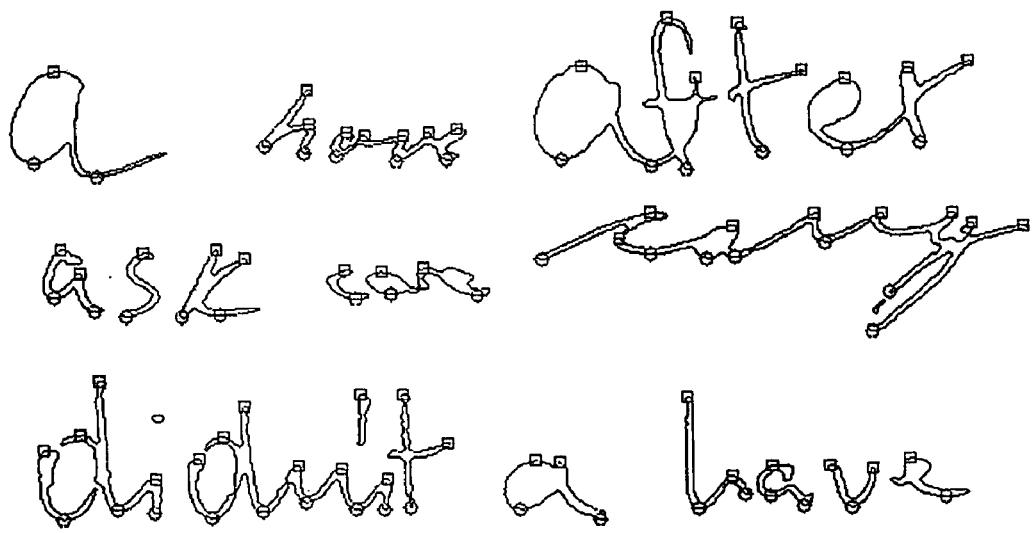
FIG. 23 is a schematic illustration of some word images wherein extrema are classified to upper peaks and lower minima, the peaks and minima being marked by squares and circles, respectively.

In table III SV and BSV denote the number of support vectors and number of bounded support vectors, respectively. The number of support vectors is small, compared with the size of the whole training set. It may indicate that features are discriminative so that a small portion of SVs can characterize the classification boundary. The above results are very promising. They indicate that the extrema can be grouped into two categories with a high accuracy though cursive word shapes exhibit considerable variations. It also infers that in low-level visual processing the data-driven learning technique with top-down information can eliminate the uncertainty of a decision to a great extent. Traditionally, the baseline information has been used to determine the upper and lower zones. But the detection of baseline is not robust due to uneven writing. Moreover, it is difficult to find a baseline for some short words. One of the appealing properties of the method according to the invention is that the output of the SVM classifier can be used as the confidence value. When the confidence value of the SVM's output is larger, the decision of the classifier becomes more reliable. Some examples are shown in FIG. 23.

It can be observed that the proposed method is insensitive to the word length and image size scale.

B. Cursive Word Recognition

The obtained feature vectors are compared with a template such as a database to generate a match between a selected handwritten word and a previously classified word. IRONOFF French check database [38] and IMDS cursive word database have been used to test the method according to the present invention. There are 30 French words in IRONOFF French check database, which consists of a training set of size 7898 and a testing set of size 3948. Some samples from this database are shown in FIG. 24.

The upper bounds of twenty-seven features in Section V.B. are shown in Table IV.

In order to compare the performance, we also implemented two discrete Hidden Markov Models (HMM) [52] were implemented for each word: one models sequential peak feature vectors; the other models sequential minima feature vectors. The two models are combined by a sum rule. The size of the codebooks is 300. The topology of Hidden Markov Models are left-right structure. Jumping over one state and looping on a state are allowed. The number of states is twice the number of letters in a word. The Hidden Markov Models are trained by Baum-Welch algorithm. The performance of two methods on IRONOFF check database and IMDS cursive database is shown in Table V.

TABLE IV

UPPER BOUNDS $b_i$, i = 1, ..., 27.

| b1 | b2 | b3 | b4 | b5 | b6 | b7 | b8 | b9 |
|---|---|---|---|---|---|---|---|---|
| 70 | 70 | 1 | 1 | 1 | 1 | 100 | 1 | 13 |
| b10 | b11 | b12 | b13 | b14 | b15 | b16 | b17 | b18 |
| 13 | 1 | 150 | 150 | 90 | 90 | 60 | 120 | 60 |
| b19 | b20 | b21 | b22 | b23 | b24 | b25 | b26 | b27 |
| 120 | 1 | 1 | 1 | 1 | 1 | 1 | 1 | 1 |

TABLE V

TESTING RECOGNITION RATES OF DYNAMIC TIME WRAPPING AND HMM

|  | Dynamic time wrapping | Hidden Markov Models |
|---|---|---|
| IRONOFF | 94.3% | 95.0% |
| IMDS database | 56.1% | 60% |

Hidden Markov Models perform slightly better than dynamic time wrapping. But their computational cost is much higher than that of dynamic time wrapping. The recognition rates of both methods on IMDS test set are low. There are several reasons. First, size of vocabulary on IMDS database is larger than that on IRONOFF check database. Second, there are many similar words in IMDS database. Finally, the average number of training samples for each word on IMDS database is 40 while the average number of training samples for each word is about 300. In order to obtain a good performance, a large number of samples are necessary.

VIII. Conclusions

Two new algorithms for word skew and slant corrections are proposed. Compared with previous methods, the method according to the invention is not only robust but also computationally efficient. In addition, a novel low-level word image representation for classification is proposed, where a word image can be represented as one sequence of peak feature vectors on the upper zone and one sequence of minima feature vectors in the lower zone. A cursive word recognition system based on the method according to the invention has been built and achieved a good performance on IRONOFF check database. Moreover, the new low-level word representation is very suitable for the construction of a hierarchical learning system, where the top-down information such as orthography, which plays a key role in word recognition, can be introduced during the training stage.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of embodiments thereof, it can be modified, without departing from the spirit, scope and nature of the subject invention as defined in the appended claims.

REFERENCES

[1] R. Bozinovic and S. Srihari, "Off-line cursive script word recognition," *IEEE Trans. Pattern Anal. Machine Intell.*, vol. 12, no. 8, pp. 63-84, 1989.

[2] M. Chen, A. Kundu, and J. Zhou, "Off-line handwritten word recognition using a hidden markov model type stochastic network," *IEEE Trans. Pattern Anal. Machine Intell.*, vol. 16, no. 5, pp. 481-496, 1994.

[3] H. Bunke, M. Roth, and E. Schukat-Talamazzini, "Off-line cursive handwriting recognition using hidden markov models," *Pattern Recognition*, vol. 28, no. 9, pp. 1399-1413, 1995.

[4] P. Gader, M. Mohamed, and J. Chiang, "Handwritten word recognition with character and intercharacter neural networks," *IEEE Trans. Syst, Man, Cybern. B*, vol. 27, no. 1, pp. 158-164, 1997.

[5] G. Kim and V. Govindaraju, "A lexicon driven approach to handwritten word recognition for real-time applications," *IEEE Trans. Pattern Anal. Machine Intell.*, vol. 19, no. 4, pp. 366-379, 1997.

[6] A. Senior and A. Robinson, "An off-line cursive handwriting recognition system," *IEEE Trans. Pattern Anal. Machine Intell.*, vol. 20, no. 3, pp. 309-321, 1998.

[7] A. El-Yacoubi, M. Gilloux, R. Sabourin, and C. Suen, "An HMM-based approach for off-line unconstrained handwritten word modeling and recognition," *IEEE Trans. Pattern Anal. Machine Intell.*, vol. 21, no. 8, pp. 752-760, 1999.

[8] S. Srihari, "Recognition of handwritten and machine-printed text for postal address interpretations," *Pattern Recognition Letters*, vol. 14, no. 4, pp. 291-302, 1993.

[9] S. Knerr, E. Augustin, O. Baret, and D. Price, "Hidden markov model based word recognition and its application to legal amount reading on french checks," *Computer Vision and Image Processing*, vol. 70, no. 3, pp. 404-419, 1998.

[10] A. Vinciarelli, S. Bengio, and H. Bunke, "Offline recognition of unconstrained handwritten texts using hmms and statistical language models," *IEEE Trans. Pattern Anal. Machine Intell.*, vol. 26, no. 6, pp. 709-720, 2004.

[11] S. Madhvanath and V. Govindaraju, "The role of holistic paradigms in handwritten word recognition," *IEEE Trans. Pattern Anal. Machine Intell.*, vol. 23, no. 2, pp. 149-164, 2001.

[12] M. Seidenberg and J. McClelland, "A distributed, developmental model of word recognition and naming," *Psychological Review*, vol. 96, pp. 523-568, 1989.

[13] D. Plaut, J. McClelland, M. Seidenberg, and K. Patterson, "Understanding normal and impaired word reading: Computational principles in quasi-regular domains," *Psychological Review*, vol. 103, pp. 56-115, 1996.

[14] J. Simpson and E. Weiner, *Oxford English Dictionary*, 2nd ed. Oxford, Clarendon Press, 1989.

[15] D. Marr, *Vision: A computational investigation into the human representation and processing of visual information*. San Francisco: Freeman, 1982.

[16] I. Biederman, "Recognition by components: A theory of human image interpretation," *Psychological Review*, vol. 94, pp. 115-147, 1987.

[17] I. Biederman and E. Cooper, "Size invariance in visual object priming," *Journal of Experimental Psychology: Human Perception and Performance*, vol. 18, pp. 121-133, 1992.

[18] J. M. D. Rumelhart, "An interactive activation model of context effects in letter perception," *Psychological Review*, vol. 88, pp. 375-407, 1981.

[19] J. Elder, "Are edges incomplete," *International Journal of Computer Vision*, vol. 34, no. 2-3, pp. 97-122, 1999.

[20] R. Venezky, *The structure of English orthography*. The Hague: Mouton, 1970.

[21] A. Ellis, "Modelling the writing process," in *Perspectives in cognitive neuropsychology*, G. Denes, C. Semenza, P. Bisiacchi, and E. Andreewsky, Eds. London: Erlbaum, 1986.

[22] J. Hollerbach, "An oscillation theory of handwriting," *Biological Cybernetics*, vol. 39, pp. 139-156, 1981.

[23] Y. Singer and N. Tishby, "Dynamical encoding of cursive handwriting," *Biological Cybernetics*, vol. 71, pp. 227-237, 1994.

[24] H.-L. Teulings and A. Thomassen, "Computer aided analysis of handwriting," *Visible Language*, vol. 13, pp. 218-231, 1979.

[25] P. Slavik and V. Govindaraju, "Equivalence of different methods for slant and skew corrections in word recognition applications," *IEEE Trans. Pattern Anal. Machine Intell.*, vol. 23, no. 3, pp. 323-326, 2001.

[26] S. Madhvanath, G. Kim, and V. Govindaraju, "Chaincode contour processing for handwritten word recognition," *IEEE Trans. Pattern Anal. Machine Intell.*, vol. 21, no. 9, pp. 928-932, 1999.

[27] M. Morita, J. Facon, F. Bortolozzi, S. Garń es, and R. Sabourin, "Mathematical morphology and weighted least squares to correct handwriting baseline skew," in *Proc. IEEE International Conference on Document Analysis and Recognition*, Bangalore, India, September 1999, pp. 430-433.

[28] M. C^ot e, E. Lecolinet, M. Cheriet, and C. Suen, "Automatic reading of cursive scripts using a reading model and perceptual concepts," *International Journal on Document Analysis and Recognition*, vol. 1, no. 1, pp. 3-17, 1998.

[29] E. Kavallieratou, N. Fakotakis, and G. Kokkinakis, "New algorithms for skewing correction and slant removal on word-level," in *Proc. IEEE 6th International Conference on Electronics, Circuits and Systems*, Pafos, Cyprus, September 1999, pp. 1159-1162.

[30] A. Vinciarelli and J. Luettin, "A new normalization technique for cursive handwritten words," *Pattern Recognition Letters*, vol. 22, no. 9, pp. 1043-1050, 2001.

[31] L. Schomaker and E. Segers, "Finding features used in the human reading of cursive handwriting," *International Journal on Document Analysis and Recognition*, vol. 2, pp. 13-18, 1999.

[32] R. Haber, L. Haber, and K. Furlin, "Word length and word shape as sources of information in reading," *Reading Research Quarterly*, vol. 18, pp. 165-189, 1983.

[33] S. Madhvanath and V. Govindaraju, "Holistic lexicon reduction," in *Proc. Third Int'l Workshop Frontiers in Handwriting Recognition*, 1993, pp. 71-81.

[34] Y. Fujisawa, M. Shi, T. Wakabayashi, and F. Kimura, "Handwritten numeral recognition using gradient and curvature of gray scale image," in *Proceedings of International Conference on Document Analysis and Recognition*, 1999, pp. 277-280.

[35] M. Mohamed and P. Gader, "Handwritten word recognition using segmentation-free hidden markov modeling and segmentation-based dynamic programming techniques," *IEEE Trans. Pattern Anal. Machine Intell.*, vol. 18, no. 6, pp. 548-554, 1996.

[36] D. Katz, *Gestalt Psychology: Its Nature and Significance*. New York: Ronald, 1950.

[37] H. Bunke, "Recognition of cursive roman handwriting—past, present and future," in *Proceedings of IEEE 7th International Conference on Document Analysis and Recognition*, Edinburgh, Scotland, August 2003, pp. 448-459.

[38] C. Viard-Gaudin, P. Lallican, S. Knerr, and P. Binter, "The IRESTE on/off IRONOFF dual handwriting database," in *Proc. IEEE International Conference on Document Analysis and Recognition*, Bangalore, India, September 1999, pp. 455-458.

[39] U.-V. Marti and H. Bunke, "The iam-database: an english sentence database for off-line handwriting recognition," *International Journal on Document Analysis and Recognition*, vol. 5, pp. 39-46, 2002.

[40] J. Sinclair, *Collins COBUILD English Dictionary for Advanced Leaners*, 3rd ed. HarperCollins Press, 2001.

[41] J. Radon, "Uber die bestimmungen von funktionen durch ihre integralwerte langs gewisser mannigfaltkeiten," *Ber. Vehr. Sachs. Akad. Wiss.*, vol. 69, pp. 262-277, 1917.

[42] F. Attneave, "Some informational aspects of visual perception," *Psychological Review*, vol. 61, no. 3, pp. 183-193, 1954.

[43] S. Edelman, T. Flash, and S. Ullman, "Reading cursive handwriting by alignment of letter prototypes," *International Journal of Computer Vision*, vol. 5, no. 3, pp. 303-331, 1990.

[44] H. Hartline, "The response of single optic nerve fibres of the vertebrate eye to illumination of the retina," *American Journal of Physiology*, vol. 121, pp. 400-415, 1938.

[45] L. Itti, C. Koch, and E. Niebur, "A model of saliency-based visual attention for rapid scene analysis," *IEEE Trans. Pattern Anal. Machine Intell.*, vol. 20, no. 11, pp. 1254-1259, 1998.

[46] J. Staddon, *Adaptive Behavior and Learning*. Cambridge University Press, Cambridge, 1983.

[47] K. Fukunaga, *Introduction to Statistical Pattern Recognition*, 2nd ed. Academic Press, 1990.

[48] V. Vapnik, *Statistical Learning Theory*. Wiley, N.Y., 1998.

[49] R. Bellman and S. Dreyfus, *Applied Dynamic Programming*. New Jersey: Princeton University Press, 1962.

[50] H. Sakoe and S. Chiba, "Dynamic programming algorithm optimization for spoken word recognition," *IEEE Trans. Acoust., Speech, Signal Processing*, vol. 20, no. 11, pp. 1254-1259, 1998.

[51] J. Dong, A. Krzyzak, and C. Suen, "Fast svm training algorithm with decomposition on very large datasets," *IEEE Trans. Pattern Anal. Machine Intell.*, vol. 27, no. 4, pp. 603-618, 2005.

[52] L. Rabiner, "A tutorial on hidden markov models and selected applications in speech recognition," *Proceedings of the IEEE*, vol. 77, no. 2, pp. 257-286, 1989.

What is claimed is:

1. A method for classifying an image representation of a handwritten word of cursive script, said method comprising:

optically reading a handwritten word so as to form an image representation thereof comprising a bit map of pixels;

extracting a pixel contour of said bit map;

detecting vertical peak and minima pixel extrema on upper and lower zones of said contour respectively;

detecting local vertical peak pixel extrema on an upper zone of said external contour by determining if a given local pixel is a vertical peak relative to neighbouring pixels;

detecting local vertical minima pixel extrema on a lower zone of said external contour by determining if a given local pixel is a vertical minimum relative to neighbouring pixels;

organizing said peak and minima pixel extrema into respective independent peak and minima sequences comprising extracting features at each said extrema and further classifying extrema into two sequences of extrema on respective said upper and lower zones of said word image pixel contour;

determining the respective feature vectors of said peak and minima sequences; and classifying said word image according to said peak and minima feature vectors, wherein at least one or more of said features extracted at each said extrema is selected from the group consisting of:

the number of local extrema neighboring a given said extrema on a same closed curve of said word image contour, said local extrema having a convex attribute corresponding to that of said given extrema;

the number of local extrema neighboring a given said extrema on a same closed curve of said word image contour, said local extrema having a different convex attribute from said given extrema;

the lesser of the height difference between a given said extrema and a left neighbouring extrema and of the height difference between said given extrema and a right neighbouring extrema, wherein said left and right neighbouring extrema have convex attribute corresponding to that of said given extrema;

the lesser of the height difference between a given said extrema and a left neighbouring extrema and of the height difference between said given extrema and a right neighbouring extrema, wherein said left and right neighbouring extrema have a different convex attribute than that of said given extrema;

the number of peaks above a said given extrema divided by the total number of peaks on said pixel contour;

the number of peaks below a said given extrema divided by the total number of peaks on said pixel contour;

the y/h position of said given extrema, wherein y represents the y-axis coordinate of said given extrema and h represents the height of said word image;

the lesser of a contour portion length between a given said extrema and a left neighbouring peak and of a contour portion length between a given said extrema and a right neighbouring peak, wherein said neighbouring peaks and said given extrema are on a same closed curve;

the lesser of a contour portion length between a given said extrema and a left neighbouring minima and of a contour portion length between a given said extrema and a right neighbouring minima, wherein said neighbouring minima and said given extrema are on a same closed curve;

the lesser of a height difference between a given said extrema and a left neighbouring peak and of a given said extrema and a and right neighbouring peak, wherein said neighbouring peaks and said given extrema are on a same closed curve;

the lesser of a height difference between a given said extrema and a left neighbouring minima and of a given said extrema and a and right neighbouring minima, wherein said neighbouring minima and said given extrema are on a same closed curve;

the height ratio of a given said extrema and neighboring left and right extrema as defined by $(y_A - y_{tl})/(y_n - y_{tln})$ wherein a given said extrema is represented by A, a lowest extrema of said left or right neighbouring extrema is represented by n, $y_{tl}$ represents the y-coordinate of the top-left corner of a said contour or a said closed curve, $y_{tln}$ represents the top-left corner of a said contour or a said closed curve where point n is located $y_A$ and $y_n$ represent the y-coordinate of A and n respectfully;

the distance between a given said extrema and a vertical intersection point; and any combination thereof.

2. A method according to claim 1, wherein said determining comprises determining feature vectors of said vertical peak and minima sequences.

3. A method according to claim 1, wherein said optically reading comprises scanning.

4. A method according to claim 1, wherein a said vertical peak pixel extrema comprises a pixel point on said upper zone of said pixel contour wherein neighbouring pixel segments are convex relative thereto.

5. A method according to claim 1, wherein a said vertical minima pixel extrema comprises a pixel point on said lower zone of said pixel contour wherein neighbouring pixel segments are concave relative thereto.

6. A method according to claim 1, further comprising correcting a slant of said bit map before said extracting of said pixel contour.

7. A method according to claim 6, further comprising correcting a skew of said bit map when correcting said slant.

8. A method according to claim 6, wherein said slant correction comprises
pre-computing a look-up table of the image representation that maps Cartesian coordinates to polar coordinates;
performing a Radon transform in the polar domain of the image representation
calculating a skew angle from the Radon transform.

9. A method according to claim 1, further comprising pruning invalid peak and minima extrema before said determining of said respective feature vectors.

10. A method according to claim 1, wherein said comparing is performed by dynamic time wrapping.

11. A method according to claim 1, wherein said determining said respective feature vectors comprises extracting features at each said extrema selected from the group consisting of:

height difference between a given said extrema and a left neighbouring extrema having a convex attribute corresponding to the that of said given extrema;

height difference between a given said extrema and a right neighbouring extrema having a convex attribute corresponding to the that of said given extrema;

relative horizontal position of given said extrema defined by:

$$f_3^c = \frac{x - x_{lt}}{w}$$

wherein said word image pixel contour is enclosed in a rectangle, the width and height of said rectangle being w and h the coordinates of a given said extrema being (x, y) and the coordinate of the top-left corner of said rectangle being $(x_{lt}, y_{lt})$ relative vertical position of a given said extrema defined by:

$$\left(f_4^c = \frac{y - y_{lt}}{h}\right)$$

wherein said word image pixel contour is enclosed in a rectangle, the width and height of said rectangle being w and h the coordinates of a given said extrema being (x, y) and the coordinate of the top-left corner of said rectangle being $(x_{lt}, y_{lt})$ projection ratio in the horizontal direction of a given said extrema defined by:

$$f_5^c = \frac{\int_a^c p(x)\,dx}{\int_a^b p(x)\,dx}$$

wherein said given extrema is represented by c and having the coordinates (x, y), and p(x) represents the projection function bounded by the x-axis interval [a, b], projection ratio in the vertical direction ($f_6^c$) of a given said extrema defined by $$f_6^c = \frac{\int_a^c p(y)dy}{\int_a^b p(y)dy}$$

wherein said given extrema is represented by c and having the coordinates (x, y), and p(y) represents the projection function bounded by the y-axis interval [a, b];
  the greater of a height difference between a given said extrema and a left neighbouring extrema and of a given said extrema and a right neighbouring extrema, wherein said left and right neighbouring extrema comprise convex attributes corresponding to that of said given extrema;
  if there is an inner loop below a said given extrema this feature is set to 1, if there is no inner loop below a said given extrema this feature is set to 0;
  total number of said peaks of said pixel contour on which said given extrema is located;
  total number of said minima of said pixel contour on which said given extrema is located;
  a height ratio of a given said extrema and neighbouring left and right extrema as defined by $(y_A-y_{tl})/(y_n-y_{tln})$ wherein a given said extrema is represented by A, a lowest extrema of said left or right neighbouring extrema is represented by n, $y_{tl}$ represents the y-coordinate of the top-left corner of a said contour or a said closed curve, $y_{tln}$ represents the top-left corner of a said contour or a said closed curve where point n is located $y_A$ and $y_n$ represent the y-coordinate of A and n respectfully;
  contour portion length between a given said extrema and a left neighbouring extrema comprising a convex attribute that is different than that of said given extrema;
  contour portion length a given said extrema and a right neighbouring extrema comprising a convex attribute that is different than that of said given extrema;
  height difference between a given said extrema and a left neighbouring extrema comprising a convex attribute that is different than that of said given extrema;
  height difference between a given said extrema and a right neighbouring extrema comprising a convex attribute that is different than that of said given extrema;
  number of pixels with a horizontal orientation on a contour portion between the a given said pixel and left neighbouring extrema comprising a convex attribute that is different than that of said given extrema;
  number of pixels with a vertical orientation on a contour portion between the a given said pixel and left neighbouring extrema comprising a convex attribute that is different than that of said given extrema;
  number of pixels with a horizontal orientation on a contour portion between the a given said pixel and right neighbouring extrema comprising a convex attribute that is different than that of said given extrema;
  number of pixels with a vertical orientation on a contour portion between the a given said pixel and right neighbouring extrema comprising a convex attribute that is different than that of said given extrema;
  projection ratio of local extrema neighbouring a given said extrema, said local extrema being on the left of said given extrema given in a horizontal direction, said projection ration being defined by:

$$f_{20}^c = \frac{\int_a^c p(x)dx}{\int_a^b p(x)dx}$$

wherein said given extrema is represented by c and having the coordinates (x, y), and p(x) represents the projection function bounded by the x-axis interval [a, b];
  projection ratio of local extrema neighbouring a given said extrema, said local extrema being on the right of said given extrema given in a horizontal direction, said projection ration being defined by $$f_{21}^c = \frac{\int_a^c p(x)dx}{\int_a^b p(x)dx}$$

wherein said given extrema is represented by c and having the coordinates (x, y), and p(x) represents the projection function bounded by the x-axis interval [a, b];
  projection of vertical crossing number of a given said extrema on the x-axis of said word image and quantification of said projection function to vertical crossing number intervals [0,3], [3,5], and [5,+8];
  crossing ratio in the horizontal direction defined by:

$$f_{25}^c = \frac{\int_a^c p(x)dx}{\int_a^b p(x)dx}$$

wherein said given extrema is represented by c and having the coordinates (x, y), and p(x) represents the projection function bounded by the x-axis interval [a, b];
  projection ratio of local extrema neighbouring a said given extreme on the left thereof in a horizontal and having a convex attribute that is different than said given extrema, said projection ration defined by $$f_{25}^c = \frac{\int_a^c p(x)dx}{\int_a^b p(x)dx}$$

wherein said given extrema is represented by c and having the coordinates (x, y), and p(x) represents the projection function bounded by the x-axis interval [a, b];
  projection ratio of local extrema neighbouring a said given extreme on the left thereof in a horizontal and having a convex attribute that is different than said given extrema, said projection ration defined by $$f_{25}^c = \frac{\int_a^c p(x)dx}{\int_a^b p(x)dx}$$

wherein said given extrema is represented by c and having the coordinates (x, y), and p(x) represents the projection function bounded by the x-axis interval [a, b];
  and any combination thereof.

* * * * *